(12) United States Patent
Arbeitman et al.

(10) Patent No.: US 11,246,400 B2
(45) Date of Patent: Feb. 15, 2022

(54) AUTOMATIC TOOTHBRUSHES

(71) Applicant: ALKE, LLC, New York, NY (US)

(72) Inventors: Keith A. Arbeitman, New York, NY (US); Pepin S. Gelardi, Brooklyn, NY (US); Theodore R. Ullrich, New York, NY (US)

(73) Assignee: ALKE, LLC, New York, NY (US)

( * ) Notice: Subject to any disclaimer, the term of this patent is extended or adjusted under 35 U.S.C. 154(b) by 248 days.

(21) Appl. No.: 16/675,153

(22) Filed: Nov. 5, 2019

(65) Prior Publication Data

US 2020/0138180 A1    May 7, 2020

Related U.S. Application Data

(60) Provisional application No. 62/755,977, filed on Nov. 5, 2018.

(51) Int. Cl.
| | |
|---|---|
| A46B 9/04 | (2006.01) |
| A46B 9/02 | (2006.01) |
| A46B 9/10 | (2006.01) |
| A46B 15/00 | (2006.01) |
| A61C 17/22 | (2006.01) |
| A61C 17/34 | (2006.01) |

(52) U.S. Cl.
CPC .............. *A46B 9/045* (2013.01); *A46B 9/026* (2013.01); *A46B 9/10* (2013.01); *A46B 15/0004* (2013.01); *A46B 15/0044* (2013.01); *A61C 17/221* (2013.01); *A61C 17/222* (2013.01); *A61C 17/228* (2013.01); *A61C 17/349* (2013.01); *A46B 2200/1066* (2013.01)

(58) Field of Classification Search
CPC ..... A61C 17/16; A61C 17/0202; A61C 17/22; A61C 17/26; A61C 17/228; A46B 9/04; A46B 9/026; A46B 9/10; A46B 9/045
See application file for complete search history.

(56) References Cited

U.S. PATENT DOCUMENTS

| | | | |
|---|---|---|---|
| 5,114,214 A | 5/1992 | Barman | |
| 5,284,168 A * | 2/1994 | Klinkhammer | ........ A46B 5/002 132/308 |
| 5,337,435 A | 8/1994 | Krasner et al. | |

(Continued)

FOREIGN PATENT DOCUMENTS

FR    3047893 A1    8/2017

OTHER PUBLICATIONS

International Search Report and Written Opinion dated Jan. 23, 2020 in International Patent Application No. PCT/US19/59929, 10 pages.

*Primary Examiner* — Shay Karls
(74) *Attorney, Agent, or Firm* — Perkins Coie LLP

(57) ABSTRACT

Automatic toothbrushes are disclosed herein. A toothbrush configured in accordance with embodiments of the present technology can include, for example, a handle and a mouthguard coupled to the handle. The mouthguard can be configured to be positioned within a mouth of a user over multiple teeth of the user. A brush assembly having a plurality of bristles can be removably positioned within the mouthguard for engaging and cleaning the teeth of the user. A motor can be disposed within or coupled to the handle and configured to articulate the brush assembly within the mouthguard.

4 Claims, 19 Drawing Sheets

(56) References Cited

U.S. PATENT DOCUMENTS

| | | | |
|---|---|---|---|
| 8,584,291 B2* | 11/2013 | Thompson | A61C 17/228 |
| | | | 15/22.1 |
| 9,308,065 B2* | 4/2016 | Steiner | A61C 17/3445 |
| 2007/0217199 A1 | 9/2007 | Adam et al. | |
| 2012/0260442 A1 | 10/2012 | Thompson | |
| 2013/0251438 A1* | 9/2013 | Vila | A46B 5/0041 |
| | | | 401/131 |
| 2020/0054121 A1* | 2/2020 | Agudo Crespo | A46B 5/0058 |

* cited by examiner

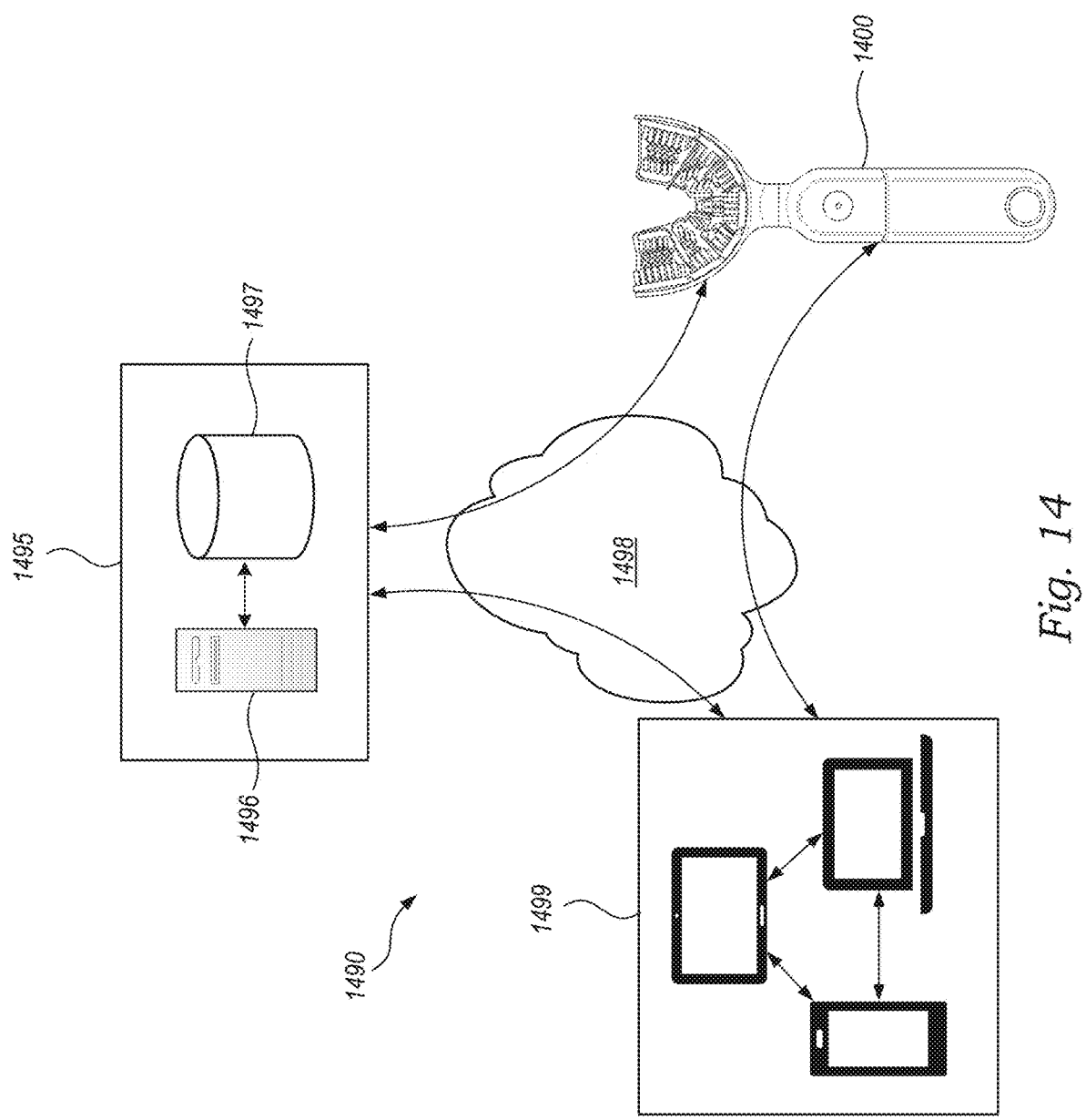

AUTOMATIC TOOTHBRUSHES

CROSS-REFERENCE TO RELATED APPLICATION

The present application claims the benefit of U.S. Provisional Patent Application No. 62/755,977, filed Nov. 5, 2018, and titled "AUTOMATIC TOOTHBRUSHES," the disclosure of which is incorporated herein by reference in its entirety.

TECHNICAL FIELD

The present technology relates generally to toothbrushes. In particular, some embodiments of the present technology are directed to mouthguard-style vibrating toothbrushes.

BACKGROUND

Oral hygiene is the practice of keeping one's mouth clean and free of disease and other problems (e.g., bad breath) by regular brushing and cleaning between the teeth. Brushing helps prevent cavities and other forms of tooth decay, as well as gingivitis and other gum diseases. Most dentists recommend brushing at least twice a day (e.g., after breakfast and before bed). However, many people who brush twice still develop tooth decay and/or gum disease due to poor brushing techniques. For example, many people fail to brush the entire surface of each tooth and/or do not brush for long enough to effectively remove dental plaque and other debris. Accordingly, there is a need in the art for improved toothbrushes and methods of toothbrushing.

BRIEF DESCRIPTION OF THE DRAWINGS

Many aspects of the present disclosure can be better understood with reference to the following drawings. The components in the drawings are not necessarily to scale. Instead, emphasis is placed on clearly illustrating the principles of the present disclosure.

FIG. 14 is a schematic view of a computing environment in which aspects of the present technology can be implemented.

DETAILED DESCRIPTION

I. Overview

Figure 1A:
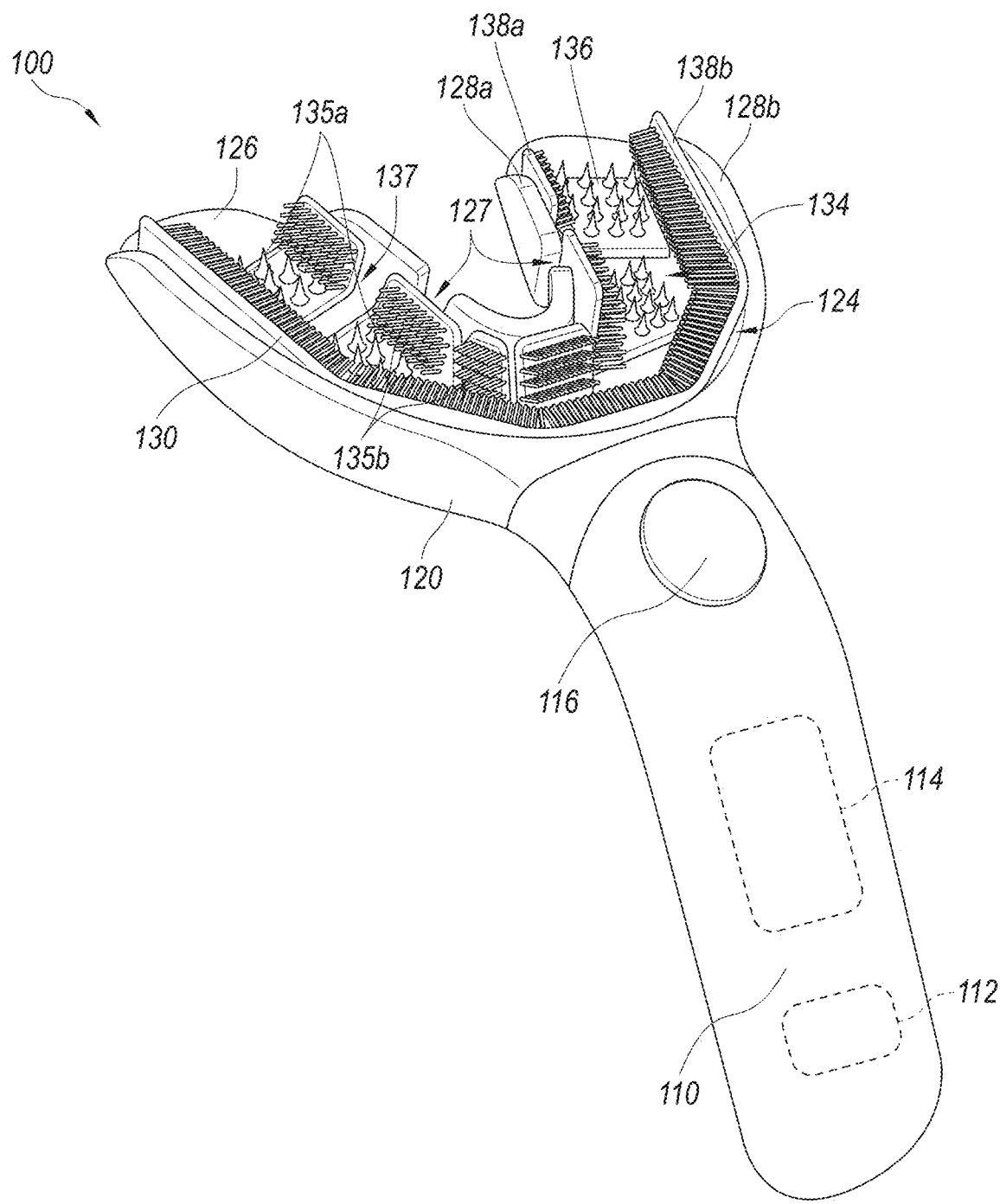
FIGS. 1A-1C are a front perspective view, an enlarged rear perspective view, and an enlarged front perspective view, respectively, of a toothbrush configured in accordance with an embodiment of the present technology.

Aspects of the present disclosure are directed generally toward electric or automatic toothbrushes. In several of the embodiments described below, for example, a toothbrush can include a handle, a mouthguard coupled to the handle, and a brush assembly having a plurality of bristles and configured to be secured within a channel of the mouthguard. The toothbrush can further include a motor operably couplable to the brush assembly for vibrating or otherwise articulating the brush assembly within the mouthguard. In some embodiments, during use, a user can position the brush assembly and mouthguard over most or substantially all of their lower or upper teeth. In some embodiments, the mouthguard is rotatably coupled to the handle and rotatable between first and second positions that are inverted relative to one another to facilitate brushing of both the upper and lower teeth of the user.

In several of the embodiments described below, a toothbrush can include a single, removable nylon bristle tray component that is composed of rigid regions and flexible regions. The rigid regions of the tray can be embedded with nylon bristles (e.g., using a CNC tufting process). When the tray is folded along the flexible creases, the tray and nylon bristles fold into a horseshoe-like shape that is adapted to wrap around the teeth of a user and angle the bristles inward, creating a geometry conducive to quickly cleaning surfaces of the user's teeth and gums. In some embodiments, the tray comprises a U-shape arrangement designed to be smaller than the average user's mouth so that the tray can be pivoted around the mouth of the user to enhance cleaning of hard-to-reach-places.

Many conventional toothbrushes require a user to continually move a brush head of the toothbrush around the surface of each individual tooth. Often, the user can inadvertently miss certain teeth or portions of teeth while brushing—leading to ineffective removal of plaque, food, and/or other debris. Likewise, many conventional toothbrushes require or recommend that the user brush for two minutes or greater to achieve effective cleaning. This long time required to brush can lead users to brush for shorter periods of time or to omit brushing entirely—reducing the cleaning effectiveness of such toothbrushes.

In contrast to conventional toothbrushes, toothbrushes configured in accordance with the present technology can reduce the time required to brush all the teeth of a user—increasing user compliance—while also simplifying the brushing process and reducing the likelihood of ineffective or incomplete brushing. Accordingly, toothbrushes configured in accordance with the present technology are expected to decrease the likelihood of a user developing tooth decay and/or gum disease.

Specific details of several embodiments of the present technology are described herein with reference to FIGS. 1A-14. However, the present technology may be practiced without some of these specific details. In some instances, well-known structures and techniques have not been shown in detail so as not to obscure the present technology. The terminology used in the description presented below is intended to be interpreted in its broadest reasonable manner, even though it is being used in conjunction with a detailed description of certain specific embodiments of the disclosure. Certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the present technology. Many of the details, dimensions, angles, and other features shown in the Figures are merely illustrative of particular embodiments of the disclosure. Accordingly, other embodiments can have other details, dimensions, angles, and features without departing from the spirit or scope of the present technology.

II. Selected Embodiments of Toothbrushes and Associated Methods

Figure 1B:
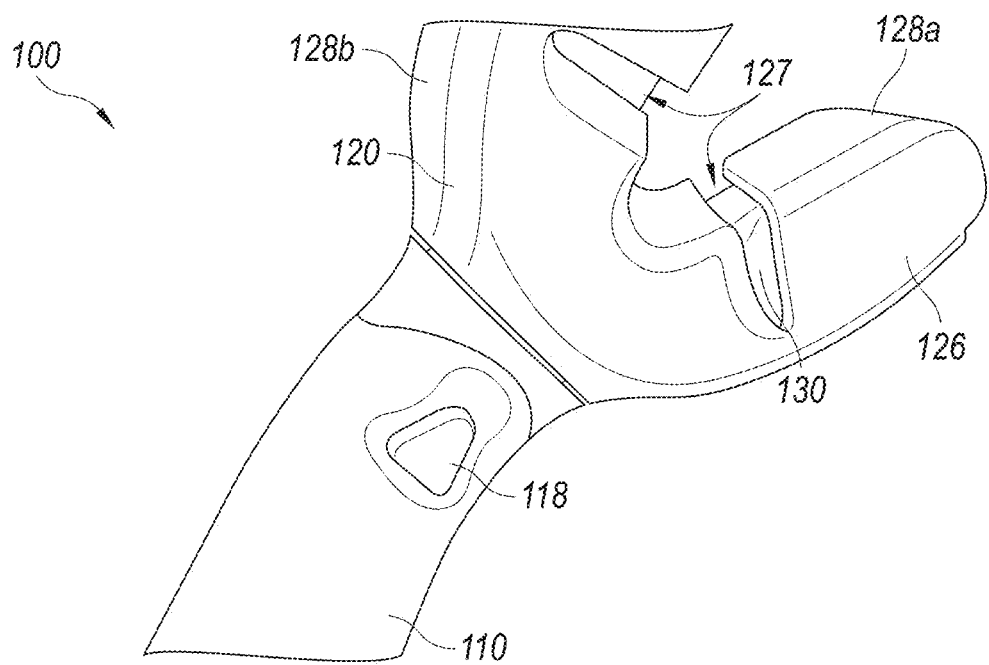
Figure 1C:
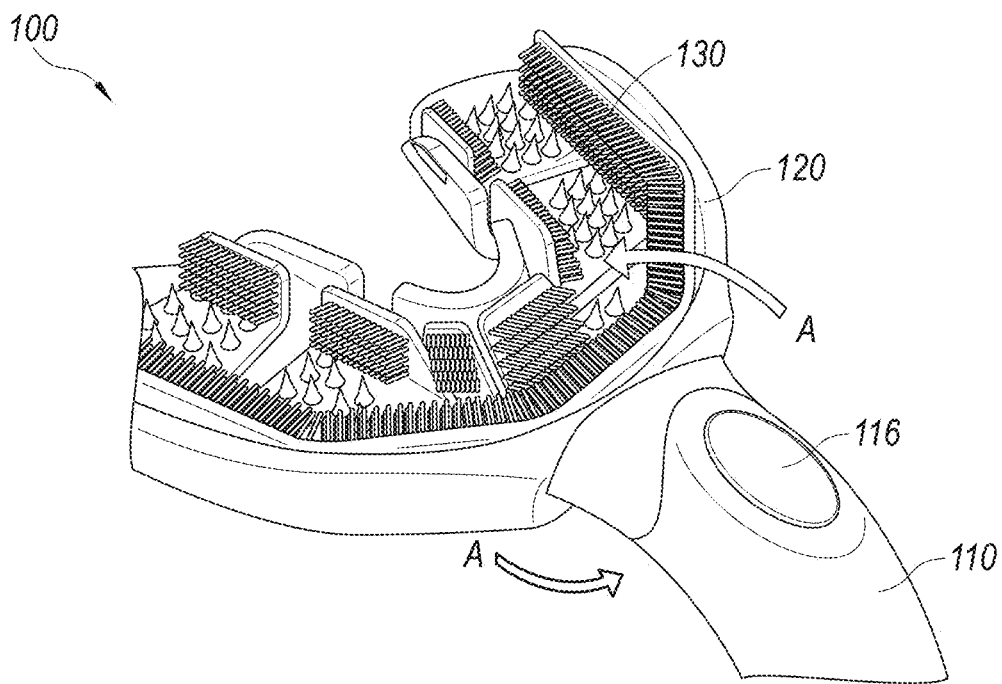

FIGS. 1A-1C are a front perspective view, an enlarged rear perspective view, and an enlarged front perspective view, respectively, of a toothbrush 100 configured in accordance with an embodiment of the present technology. Referring to FIGS. 1A-1C together, the toothbrush 100 includes a handle 110, a mouthguard 120 rotatably coupled to the handle 110, and a bristle or brush assembly 130 positioned within the mouthguard 120. As described in detail below, during operation of the toothbrush 100, a user can grip the handle 110 to position the mouthguard 120 in their mouth and around their upper and/or lower teeth to facilitate brushing and cleaning of the teeth via the brush assembly 130.

Referring to FIGS. 1A and 1B together, in the illustrated embodiment, the mouthguard 120 includes a body having a base or trough portion 126 and wall portions 128 (individually labeled as first wall portion 128a and second wall portion 128b) extending from the trough portion 126. In the illustrated embodiment, the first wall portion 128a is positioned radially inward of the second wall portion 128b. The mouthguard 120 further defines a channel 124 configured to receive the brush assembly 130 therein. In some embodiments, a plurality of slots (e.g., recesses, cuts, slits, etc.) 127 extend at least partially through the mouthguard 120. In the illustrated embodiment, two slots 127 extend entirely through the first wall portion 128a and partially through the trough portion 126 toward the second wall portion 128b. As shown, the slots 127 each have generally the same size and are positioned symmetrically around the mouthguard 120. In other embodiments, the slots 127 can have different dimensions, orientations, etc., can be positioned asymmetrically about the mouthguard 120, and/or can include more or fewer than the two illustrated slots 127. As described in detail below with reference to FIGS. 5A and 5B, the slots 127 can allow the mouthguard 120 to bend or flex to, for example, facilitate movement of the mouthguard 120 across all of the user's lower and/or upper teeth.

Referring to FIG. 1A, the brush assembly 130 can be positioned within the channel 124 of the mouthguard 120. In some embodiments, the brush assembly 130 can be removably positioned within the channel 124 while, in other embodiments, the brush assembly 130 can be integrally formed with the mouthguard 120 or otherwise permanently coupled to the mouthguard 120. In some embodiments, the brush assembly 130 can be disposable and intended for a predefined number of uses or for use over a predetermined period.

In the illustrated embodiment, the brush assembly 130 includes a body having a base or trough portion 136 and wall portions 138 (individually labeled as first wall portion 138a and second wall portion 138b) extending from the trough portion 136. In the illustrated embodiment, the first wall portion 138a is positioned radially inward of the second wall portion 138b. The brush assembly 130 further defines a channel 134. In some embodiments, a plurality of slots (e.g., recesses, cuts, slits, etc.) 137 extend at least partially through the brush assembly 130. In the illustrated embodiment, six slots 137 extend entirely through the first wall portion 138a and partially through trough portion 136 toward the second wall portion 138b. As shown, the slots 137 have varying dimensions and are positioned symmetrically about the brush assembly 130. In other embodiments, the slots 137 can have the same or different dimensions, orientations, etc., can be positioned asymmetrically about the brush assembly 130, and/or can include more or fewer than the six illustrated slots 137. As described in detail below with reference to FIGS. 4A and 4B, the slots 137 can allow the brush assembly 130 to, for example, facilitate rotational or articulating movement of the brush assembly 130 within the mouthguard 120. Moreover, the slots 137 can allow the brush assembly 130 to bend or flex to, for example, facilitate movement of the brush assembly 130 across all of the user's lower and/or upper teeth.

The brush assembly 130 further includes a plurality of bristles 135 (individually labeled as first bristles 135a and second bristles 135b) extending from an inner surface of the brush assembly 130 and into the channel 134. In the illustrated embodiment, the first bristles 135a have a generally conical shape and extend from the trough portion 136 of the brush assembly 130, and the second bristles 135b have a generally cylindrical shape and extend from the wall portions 138 of the brush assembly 130. Moreover, the second bristles 135b each have a smaller cross-sectional dimension (e.g., diameter) than the first bristles 135a and are more tightly spaced than the first bristles 135a.

During operation of the toothbrush 100, the bristles 135 are configured to engage with and contact the surfaces of the user's teeth and/or the interstitial spaces between the user's teeth to remove or dislodge debris (e.g., plaque, food, etc.) therefrom. In some embodiments, for example, the first bristles 135a are positioned to contact the crowns (e.g., top surfaces) of the user's teeth while the second bristles 135b are positioned to contact side surfaces of the user's teeth and to at least partially enter the interstitial spaces between the user's teeth. In some embodiments, the bristles 135 can be made from nylon, silicon, and/or other suitable materials.

Figure 2:
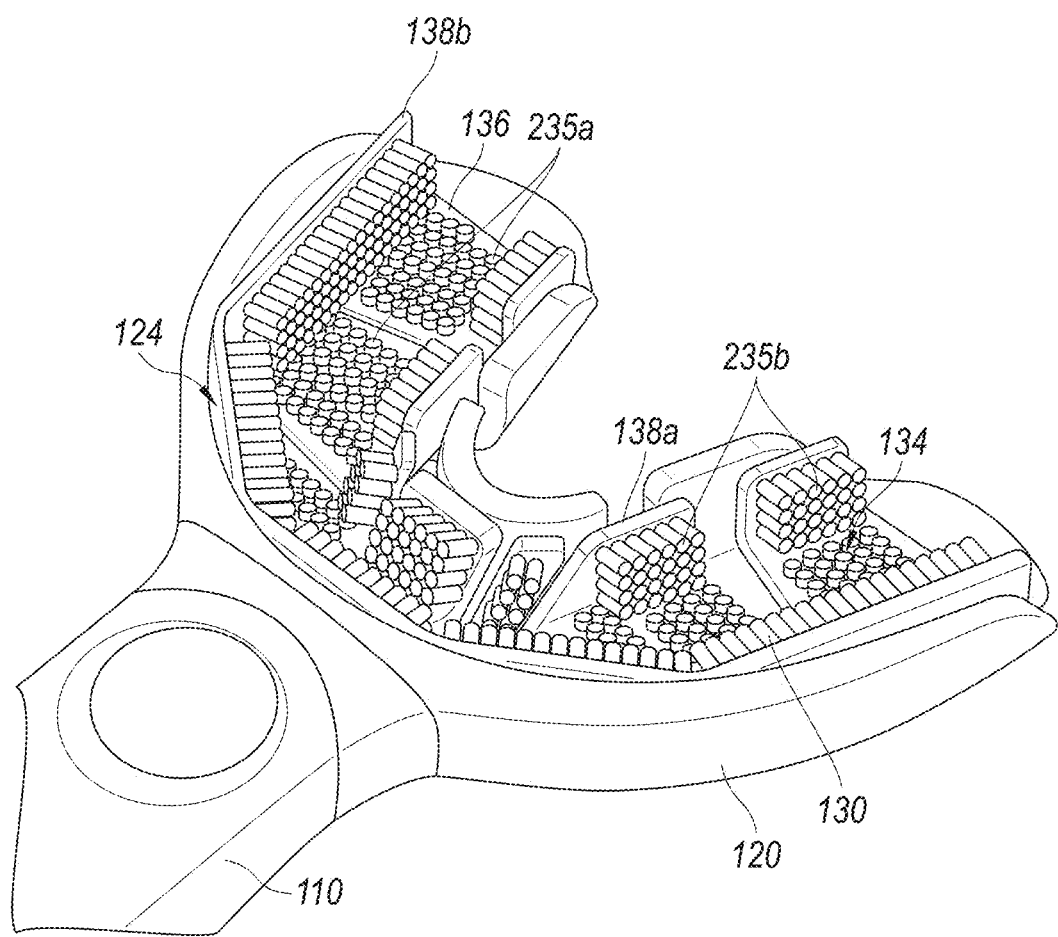
FIG. 2 is an enlarged front perspective view of the toothbrush shown in FIGS. 1A-1C having bristles configured in accordance with another embodiment of the present technology.

In other embodiments, the bristles 135 can have other suitable configurations. For example, the bristles 135 can have different spacing, cross-sectional dimensions, shapes, angles relative to the brush assembly 130, lengths, finishes, end shapes (e.g., flat-ended, round-ended, etc.), etc., and the bristles 135 can include one or more than two groups of bristles having different shapes, arrangements, etc. For example, the bristles 135 can all have the same angle, diameter, length, and finish while, in other embodiments, the bristles 135 could have varying angles offset with one another, and varying diameters, lengths, finishes, etc. FIG. 2, for example, is an enlarged front perspective view of the toothbrush 100 having bristles configured in accordance with another embodiment of the present technology. In the illustrated embodiment, the brush assembly 130 includes a plurality of first bristles 235a and a plurality of second bristles 235b each having the same generally cylindrical shape and cross-sectional dimension (e.g., diameter). In the illustrated embodiment, the first bristles 235a extend from the trough portion 136 of the brush assembly 130, and the second bristles 235b extend from the wall portions 138 of the brush assembly 130. In some embodiments, each of the second bristles 235b can have a length that is longer than a length of the first bristles 235a to, for example, enable the first bristles 235b to reach into and clean the interstitial spaces between the teeth of the user.

Figure 1D:
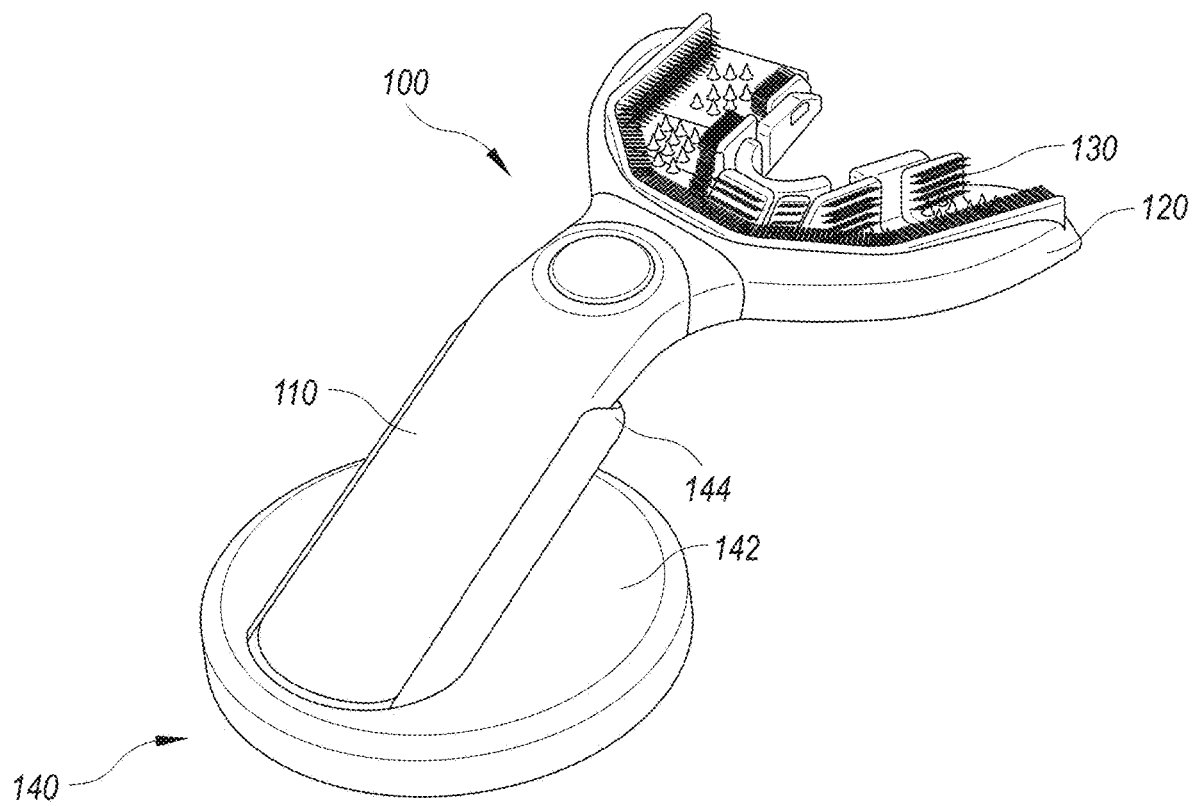
FIGS. 1D and 1E are side and front perspective views, respectively, of the toothbrush shown in FIGS. 1A-1C positioned within a charging stand configured in accordance with an embodiment of the present technology.
Figure 1E:
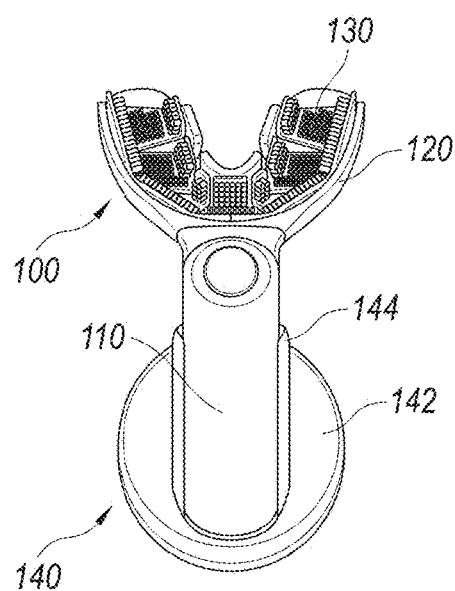

Referring again to FIG. 1A, the handle 110 can have a generally curved or angled shape relative to the mouthguard 120 and is configured to be gripped and held by the user while brushing with the toothbrush 100. The handle 110 can further include a power source 112 (shown schematically) operably coupled to a motor 114 (shown schematically). In some embodiments, the motor 114 can be configured to generate vibratory, oscillatory, and/or articulating motion via a piezoelectric component, a magnetostrictive component, an eccentric rotating mass component, and/or another suitable component. In certain embodiments, for example, the motor 114 can be a rotary motor coupled to an offset mass or a linear resonant actuator motor. In some embodiments, the motor 114 can be coupled to a slotted link mechanism (e.g., a Scotch Yoke) that translates a rotational motion of the motor 114 into a linear motion that drives the brush assembly 130. The power source 112 can be any suitable power source, such as a rechargeable or disposable battery or another type of power source. In some embodiments, the power source 112 can be rechargeable via inductive charging. FIGS. 1D and 1E, for example, are side and front perspective views, respectively, of the toothbrush 100 positioned within a charging stand 140 ("stand 140") configured in accordance with an embodiment of the present technology. In the illustrated embodiment, the stand 140 includes a base 142 and an arm 144 extending from the base 142. The arm 144 can be configured to receive and support the handle 110 of the toothbrush 100 such that mouthguard 120 and brush assembly 130 are elevated above, for example, a counter surface to avoid or inhibit contamination of the mouthguard 120 and brush assembly 130. In some embodiments, the stand 140 includes an inductive charger (not shown) configured to charge the power supply 112 of the toothbrush 100 when the toothbrush 100 is positioned therein.

Figure 3:
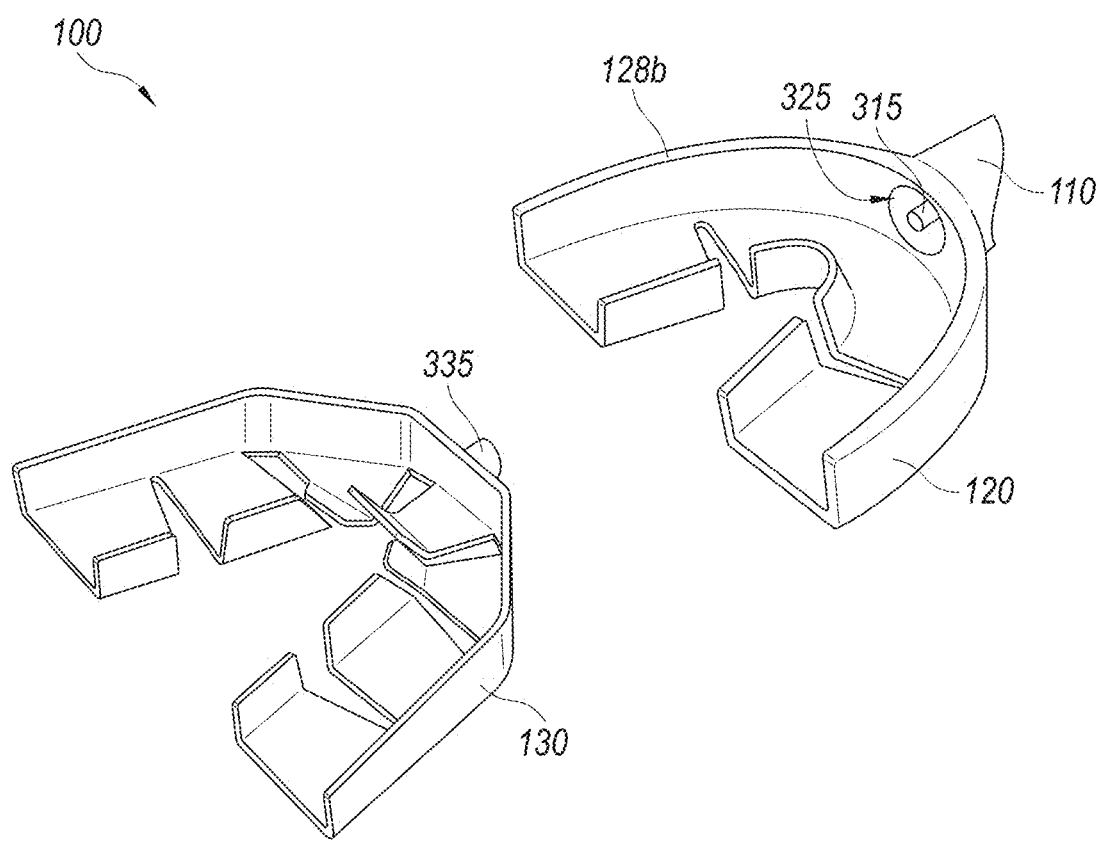
FIG. 3 is a side perspective view of the toothbrush shown in FIGS. 1A-1C illustrating a brush assembly removed from a mouthguard in accordance with an embodiment of the present technology.

In some embodiments, as described in greater detail below with reference to FIGS. 4A and 4B, the motor 114 is configured to receive power from the power source 112 and to drive articulating, vibratory, oscillatory, and/or rotational movement of the brush assembly 130 within the mouthguard 120. More specifically, the brush assembly 130 can be inserted into and secured within the mouthguard 120 such that the brush assembly is mechanically coupled to the motor 114. FIG. 3, for example, is a side perspective view of the toothbrush 100 showing the brush assembly 100 removed from the mouthguard 120 in accordance with an embodiment of the present technology. In the embodiment illustrated in FIG. 3, an aperture 325 is formed in the second wall portion 128b of the mouthguard 120 and is aligned with the handle 110. In some embodiments, a coupling member 315, such as a shaft, extends into the aperture 325 and is operably coupled to the motor 114. The brush assembly 130 can include an engagement feature 335 configured to be positioned within the aperture 325 and to interface with or otherwise engage with the coupling member 315 to operably couple the motor 114 to the brush assembly 130. In operation, the user can removably position and secure the brush assembly 130 within the mouthguard 120 by inserting the engagement feature 335 of the brush assembly 130 into the aperture 325 of the mouthguard 120 (e.g., via a snap-fit or other locking arrangement). In other embodiments, the brush assembly 130 can be operably coupled to the motor 114 and/or the mouthguard 120 via other suitable means.

Referring again to FIGS. 1A-1C together, the handle 110 further includes a first button 116 and a second button 118. In the illustrated embodiment, the first button 116 is a power button disposed on an upper surface or side of the handle 110. In some embodiments, for example, the first button 116 can be depressed to power-on or power-off the motor 114 (e.g., to electrically connect/disconnect the power source 112 and motor 114) to thereby drive movement of the brush assembly 130. In some embodiments, the first button 116 can be configured to receive multiple types of input (e.g., different patterns or lengths of depression) to control different functionalities of the power source 112, motor 114, and/or other components of the toothbrush 100. In some embodiments, for example, the first button 116 can be used to control different operational modes of the motor 114 (e.g., a low-power mode, high-power mode, battery-saving mode, etc.) and thus to control different vibratory frequencies or speeds of the brush assembly 130. In other embodiments, any of these functionalities can be incorporated into one or more buttons in other locations on the toothbrush 100.

In the illustrated embodiment, the second button 118 is configured to enable rotation of the mouthguard 120 (and the brush assembly 130 disposed therein) relative to the handle 110. In the embodiment illustrated in FIG. 1C, for example, depression of the second button 118 can unlock (e.g., via a latch or suitable locking feature) the mouthguard 120 relative to the handle 110 to thereby enable rotation of the mouthguard 120 in a direction indicated by arrows A (e.g., the counterclockwise direction). In some embodiments, the mouthguard 120 is rotatable about 180 degrees between a first locking position and a second locking position. For example, in a first locking position illustrated in FIGS. 1A-1C, the mouthguard 120 can be positioned to surround and/or engage the upper teeth of the user when positioned in the mouth of the user. In the second locking position, the mouthguard 120 can be flipped vertically (e.g., upside down, inverted, etc.) relative to the embodiment illustrated in FIGS. 1A-1C and is therefore positioned to surround and/or engage the lower teeth of the user when positioned in the mouth of the user. In some embodiments, the user can depress the second button 118 to unlock (e.g., enable rotational movement of) the mouthguard 120 and then rotate the mouthguard 120 relative to the handle 110 to transition the mouthguard 120 between the first and second locking positions. By rotating the mouthguard 120, the user can maintain the handle 110 in the same position while brushing both the user's upper and lower teeth. Moreover, the angled orientation 110 is expected to provide a comfortable hand and arm position for the user during brushing.

Figure 4A:
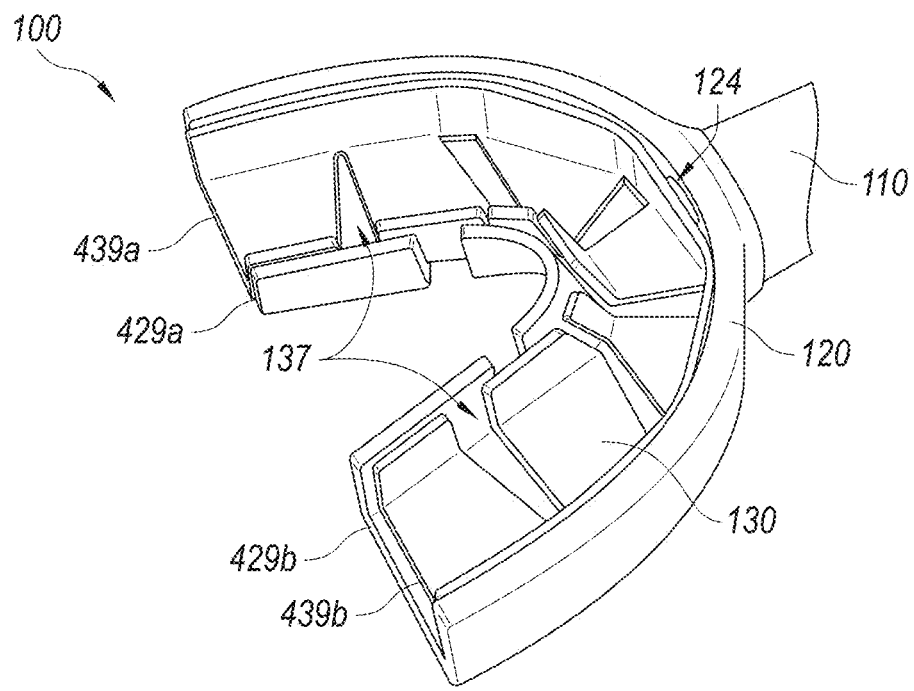
FIGS. 4A and 4B are enlarged top perspective views of the toothbrush shown in FIGS. 1A-1C illustrating movement of the brush assembly within the mouthguard in accordance with embodiments of the present technology.
Figure 4B:
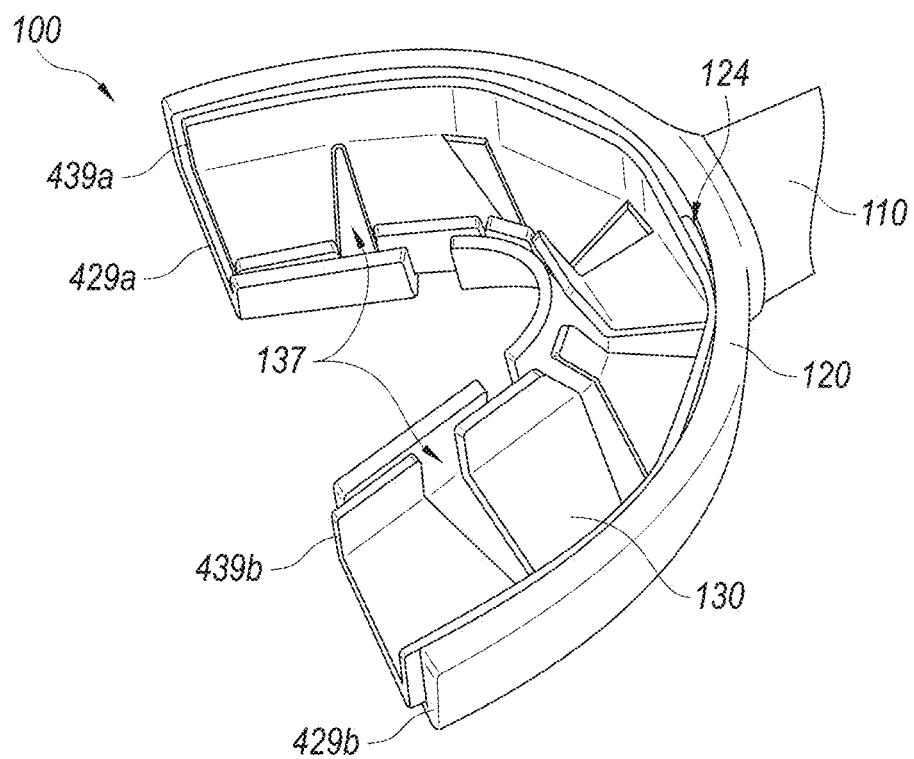

FIGS. 4A and 4B are enlarged top perspective views of the toothbrush 100 illustrating movement of the brush assembly 130 within the mouthguard 120 when the motor 114 is powered-on (e.g., via depression of the first button 116) and coupled to the brush assembly 130 (e.g., via positioning of the engagement feature 335 within the corresponding aperture 325) in accordance with embodiments of the present technology. More particularly, the motor 114 (FIG. 1A) can be configured to drive (e.g., rotate, articulate, oscillate, vibrate, etc.) the brush assembly 130 between a first position (FIG. 4A) and a second position (FIG. 4B). In the first position, a first end portion 439a of the brush assembly 130 is positioned at or adjacent to, and/or extends beyond a first end portion 429a of the mouthguard 120. In the second position, a second end portion 439b of the brush assembly 130 is positioned at or adjacent to, and/or extends beyond a second end portion 429b of the mouthguard 120. That is, the brush assembly 130 can be rotated through the channel 124 of the mouthguard 120 between the end portions 429 of the mouthguard 120. As shown in FIGS. 4A and 4B, the slots 137 in the brush assembly 130 permit the brush assembly 130 to flex or bend and can facilitate smooth movement of the brush assembly 130 along the entire length of the channel 124 of the mouthguard 120. In some embodiments, the motor 114 operates to repeatedly drive the brush assembly 130 between the first and second positions at a predetermined frequency (e.g., about 400 Hz). The movement of the brush assembly 130 can repeatedly drive the bristles (FIG. 2) against the teeth of the user to clean the teeth.

Figure 5A:
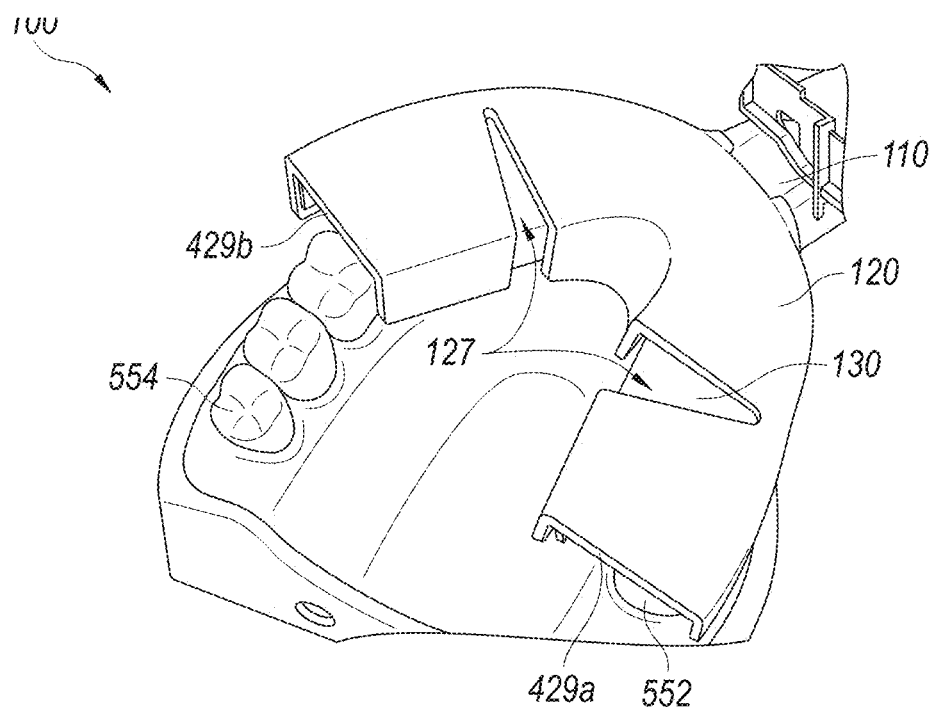
FIGS. 5A and 5B are enlarged bottom perspective views of the toothbrush shown in FIGS. 1A-1C illustrating movement of the mouthguard relative to a user's teeth in accordance with embodiments of the present technology.
Figure 5B:
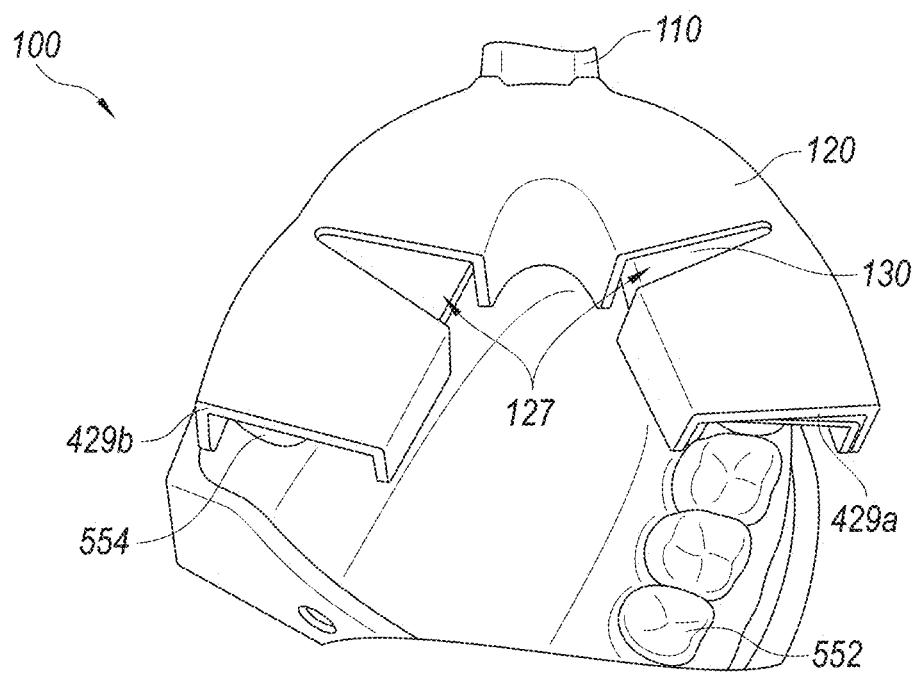

FIGS. 5A and 5B are enlarged bottom perspective views of the toothbrush 100 illustrating movement of the mouthguard 120 relative to teeth (e.g., the teeth of a user) in accordance with embodiments of the present technology. More particularly, the mouthguard 120 is movable between a first position (FIG. 5A) and a second position (FIG. 5B). In the first position, the first end portion 429a of the mouthguard 120 is positioned proximate to a right tooth 552 positioned farthest back in the user's mouth (e.g., a second or third molar). In the second position, the second end portion 429b of the mouthguard 120 is positioned proximate to a left tooth 554 positioned farthest back in the user's mouth (e.g., a second or third molar). That is, the mouthguard 120—and brush assembly 130 disposed therein—are movable along a path over (e.g., along, across, etc.) all of the lower or upper teeth of the user such that the brush assembly 130 substantially engages and cleans each tooth. Moreover, the user can grip the handle 110 and use a simple back and forth movement to move the mouthguard 120 between the first and second positions to brush each tooth. As shown in FIGS. 5A and 5B, the slots 127 in the mouthguard 120 permit the mouthguard 120 to flex or bend and can facilitate smooth and easy movement of the mouthguard 120 across each of the user's teeth. Notably, the mouthguard 120 can be a single-size (e.g., one-size-fits-all) component since the mouthguard 120 can be rotated more or less to cover and brush larger/smaller tooth layouts.

In certain embodiments, the mouthguard 120 is specifically designed to be smaller than the user's mouth or an average mouth to encourage and/or enable pivoting of the mouthguard 120 and brush assembly 130 to enhance cleaning of hard-to-reach places. In other embodiments, the mouthguard 120 and brush assembly 130 can be sized to fit a specific user and/or can be configured to cover each of a user's upper or lower teeth at the same time, without requiring rotation of the mouthguard 120. For example, the mouthguard 120 can be an upper mouthguard, and the toothbrush 100 can further include a lower mouthguard coupled to the upper mouthguard 120 and/or the handle 110. In such embodiments, the lower mouthguard can include a lower brush assembly installed therein to enable the user to brush both their lower and upper teeth simultaneously.

With reference to FIGS. 1A-5B, to use the toothbrush 100, a user can first insert the brush assembly 130 into the mouthguard 120 and optionally deposit toothpaste into the channel 134 of the brush assembly 130. The user can then (a) grip the handle 110 and position the mouthguard 120 and the brush assembly 130 in their mouth and around either their upper or lower teeth, and (b) press the first button 116 to power-on the motor 114 to drive (e.g., vibrate) the brush assembly 130. In some embodiments, the user can use a back-and-forth brushing motion (e.g., as shown in FIGS. 5A and 5B) to rotate the mouthguard 120 across and around each tooth. After brushing their upper or lower teeth, the user can subsequently depress the second button 118 and rotate the mouthguard 120 and brush assembly 130 relative to the handle 110 for positioning across and around the other of their upper or lower teeth. In this manner, the user can quickly transition between brushing their upper and lower teeth while also maintaining the same arm and hand posture that, for example, allows for the same back-and-forth brushing motion to be used. Moreover, in some embodiments, the toothbrush 100 can include a timer and/or one or more alert devices operably coupled to the timer for alerting the user that brushing has been completed or that it is time to flip or rotate the toothbrush 100 to brush the other of the upper or lower teeth. For example, the toothbrush 100 can be configured to vibrate, emit an audible sound, emit a visible signal, and/or otherwise alert the user after a predefined time has passed during the brushing process.

Because the mouthguard 120 and brush assembly 130 surround and clean a substantial portion of the user's teeth at the same time, the time required to brush each of the upper and lower teeth is greatly reduced compared to conventional toothbrushes. In some embodiments, for example, the user need only brush their upper teeth and lower teeth with the toothbrush 100 for about 15 seconds to effectively remove plaque and other debris therefrom—for a total brushing time of about 30 seconds. Such a reduced brushing time is expected to increase user compliance and brushing frequency. Moreover, the likelihood of user oversight (e.g., forgetting or missing a tooth during brushing) is greatly reduced because the only motion required by the user is a simple back-and-forth motion. That is, the user does not need to rotate and translate the toothbrush 100 to reach every tooth surface. Accordingly, toothbrushes configured in accordance with the present technology are expected to reduce the time required to brush a user's teeth while also increasing the effectiveness of such brushing.

Figure 6A:
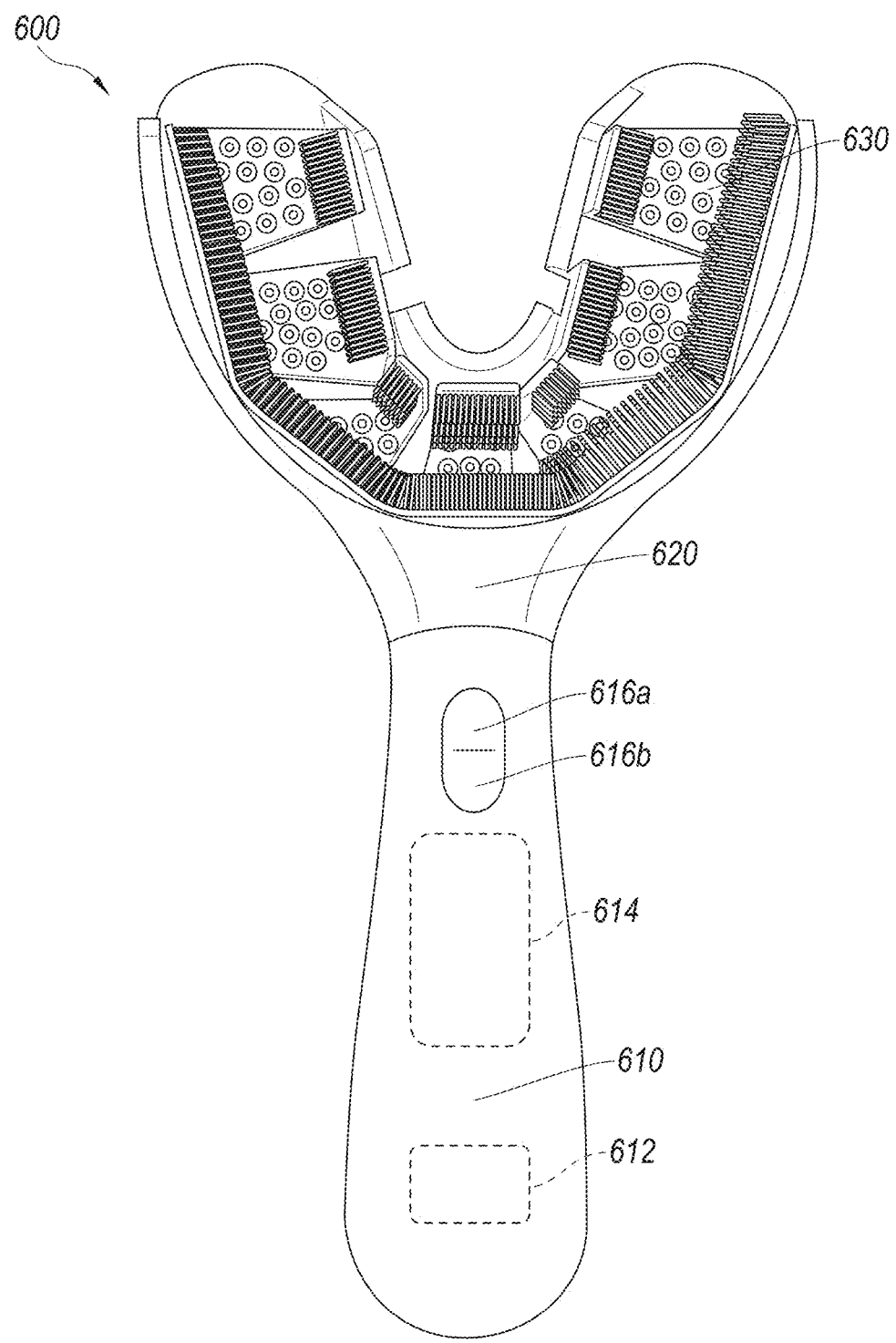
FIG. 6A is a front view of a toothbrush configured in accordance with another embodiment of the present technology.

FIG. 6A is a front view of a toothbrush 600 configured in accordance with another embodiment of the present technology. The toothbrush 600 includes some features generally similar to the features of the toothbrush 100 described in detail above with reference to FIGS. 1A-5B. For example, the toothbrush 600 includes a handle 610 coupled to a mouthguard 620, and a brush assembly 630 removably positioned within the mouthguard 620. The handle 610 further includes a power supply 612 and a motor 614. In the illustrated embodiment, however, the handle 610 is generally straight (e.g., extends linearly away from the mouthguard 620) and the mouthguard 620 is not rotatably coupled to the handle 610. Accordingly, during use, a user can first grip the handle 610 and position the mouthguard 620 and brush assembly 630 within their mouth around either their upper or lower teeth. To position the mouthguard 620 and brush assembly 630 around the other of their upper or lower teeth, the user can simply rotate the handle 610 to thereby rotate the mouthguard 620 and brush assembly 630.

Moreover, in the illustrated embodiment, the handle 610 includes a power-increase button 616a and a power-decrease button 616b. In some embodiments, the user can depress the power-increase button 616a to increase the power supplied to the motor 614 from the power source 612 or to otherwise increase the movement frequency (e.g., vibratory frequency) of the brush assembly 630 within the mouthguard 620. Likewise, in some embodiments, the user can depress the power-decrease button 616b to decrease the power supplied to the motor 614 from the power source 612 or to otherwise increase the movement frequency of the brush assembly 630 within the mouthguard 620.

Figure 6B:
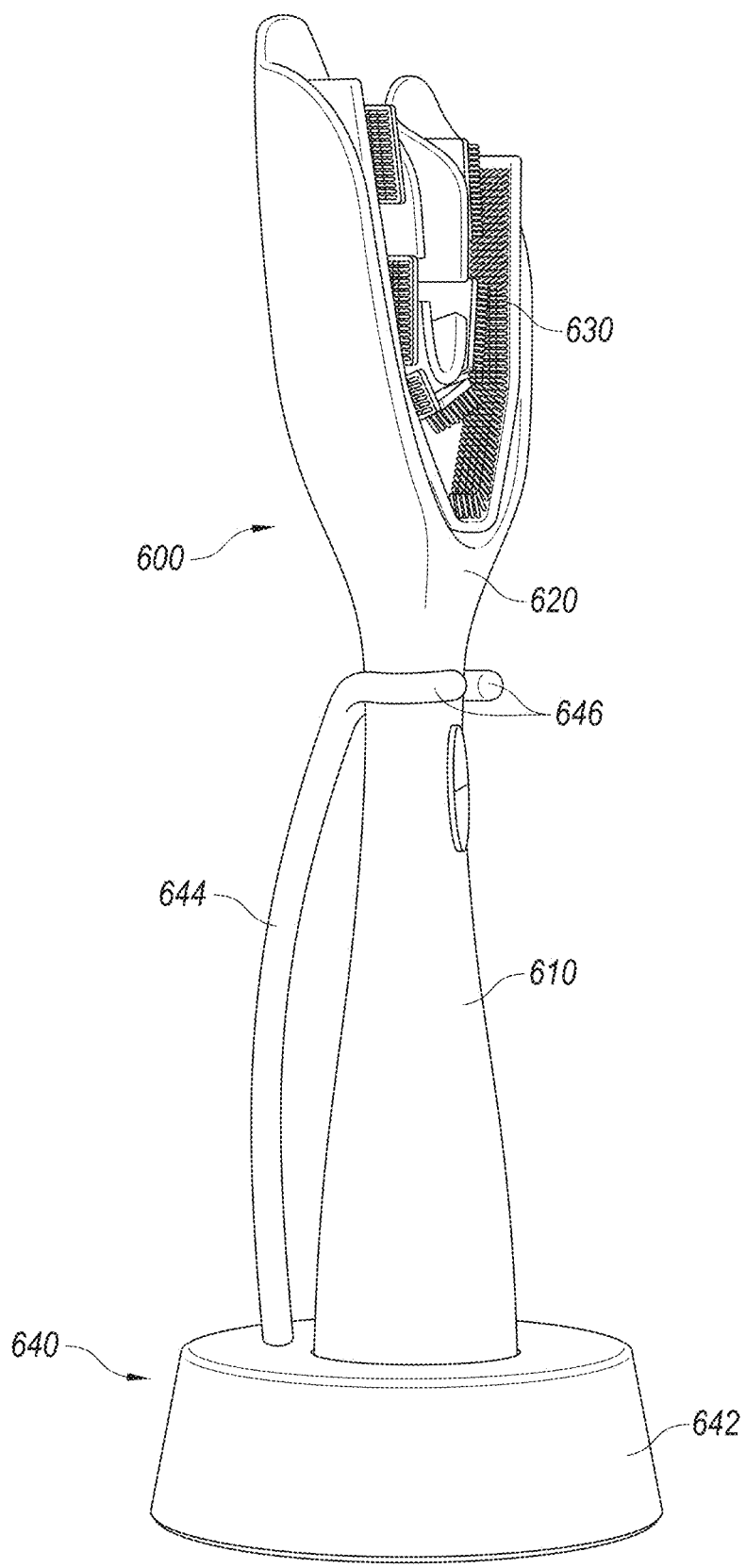
FIG. 6B is a side perspective view of the toothbrush shown in FIG. 6A positioned within a charging stand configured in accordance with an embodiment of the present technology.

In some embodiments, the power source 612 can be rechargeable via inductive charging. FIG. 6B, for example, is a side perspective view of the toothbrush 600 positioned within a charging stand 640 ("stand 640") configured in accordance with an embodiment of the present technology. In the illustrated embodiment, the stand 640 includes a base 642, a support member 644 extending from the base 642, and arms 646 extending from the support member 644. As shown, the arms 646 can be configured to receive and support the handle 610 of the toothbrush 600 such that the mouthguard 620 and the brush assembly 630 are elevated above, for example, a counter surface to avoid or inhibit contamination of the mouthguard 620 and brush assembly 630. In some embodiments, the stand 640 includes an inductive charger (not shown) configured to charge the power source 612 of the toothbrush 600 when the toothbrush 600 is positioned therein. In other embodiments, the toothbrush 600 can be directly connected (e.g., via a cord) to an external power source (e.g., an AC plug) for charging the power source 612.

Figure 7A:
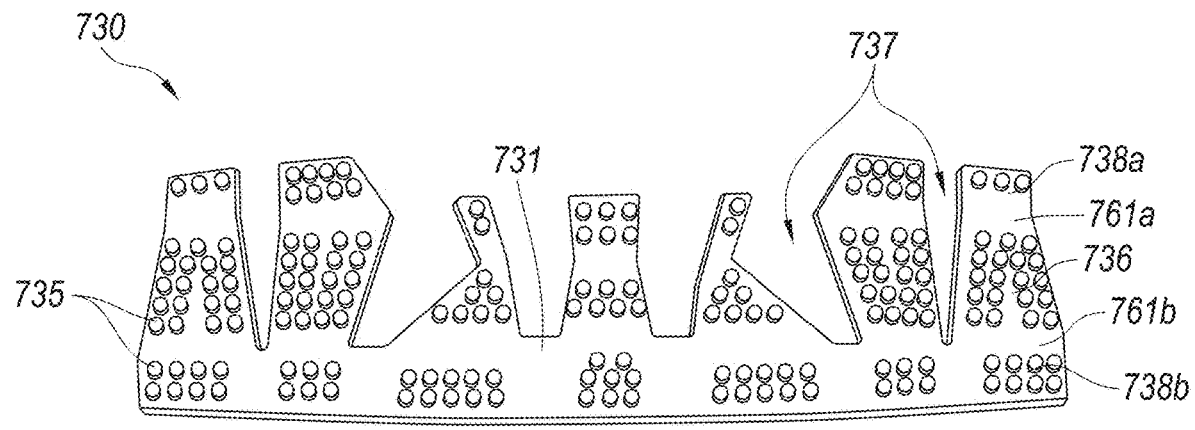
FIGS. 7A and 7B are a top view and a top perspective view, respectively, illustrating various stages in a method of manufacturing a brush assembly configured in accordance with embodiments of the present technology.
Figure 7B:
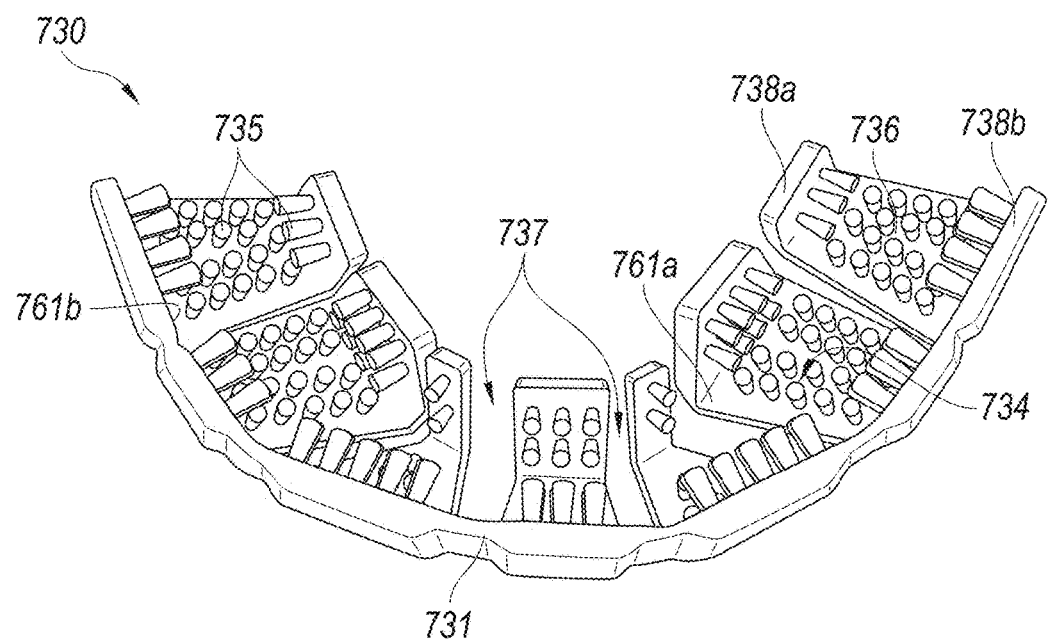

FIGS. 7A and 7B are a top view and a top perspective view, respectively, illustrating various stages in a method of manufacturing a brush assembly 730 configured in accordance with embodiments of the present technology. The brush assembly 730 can be generally similar to the brush assemblies 130 and 630 described in detail above with reference to FIGS. 1A-6B. For example, referring to FIGS. 7A and 7B together, the brush assembly 730 includes a body 731 having a base or trough portion 736 and wall portions 738 (individually labeled as first wall portion 738a and second wall portion 738b) extending from the trough portion 736. Likewise, a plurality of slots 737 extend at least partially through the brush assembly 730, and a plurality of bristles 735 are coupled to the brush assembly 730.

Referring to FIG. 7A, the brush assembly 730 can initially be manufactured in a generally planar form in which the trough portion 736 and wall portions 738 are generally flat. The bristles 735 are shown attached to or embedded in the body of the brush assembly 730 in FIG. 7A. In some embodiments, for example, the bristles 735 can be installed using computer numerical control (CNC) tufting or another suitable process. More specifically, the bristles 735 can be installed using an anchor free tufting (AFT) process/machine, a pressure-heat-time (PTt) machine/process, and/or another suitable anchor-free manufacturing technique. In other embodiments, the bristles 735 can be staple set to the brush assembly 730 (e.g., each of the bristles 735 can be secured to the brush assembly 730 via one or more staples inserted into the brush assembly 730). In the illustrated embodiment, the brush assembly 730 includes (i) a first crease 761a between the first wall portion 738a and the trough portion 736 and (ii) a second crease 761b between the second wall portion 738b and the trough portion 736. In some embodiments, the creases 761 are formed to be more flexible than the trough portion 736 and/or the wall portions 738. For example, in some embodiments, the creases 761 can be made thinner than the trough portion 736 and the wall portions 738. In other embodiments, the creases 761 can comprise a different material (e.g., a more flexible material) than the trough portion 736 and the wall portions 738. In some such embodiments, the brush assembly 730 can be formed via an over-molding process. In yet other embodiments, the creases 761 can comprise mechanical hinges. In some embodiments, none of the bristles 735 are coupled to the brush assembly 730 at or along the creases 761.

Referring to FIG. 7B, the method can include bending or folding the brush assembly 730 along creases 761 to define a channel 734. Specifically, the wall portions 738 can be bent relative to the trough portion 736. In some embodiments, the brush assembly 730 can be heated before and/or during folding to prevent spring back (e.g., deformation of the channel 734 via relaxing of the wall portions 738 relative to the trough portion 736). In some embodiments, the brush assembly 730 can be formed of a relatively pliable material that does not require heating to fold the brush assembly 730 into the desired shape. Moreover, in certain embodiments, the bristles 735 can be installed into the brush assembly 730 to have variable angles and/or lengths (e.g., during a CNC tufting process) such that, after folding the brush assembly 730 along the creases 761, the angles and lengths of the bristles 735 resolve into a desired topography that is engineered to maximize teeth brushing efficacy. In one aspect of the present technology, installing the bristles 735 while the brush assembly 730 has the generally planar form shown in FIG. 7A simplifies the manufacturing process. In contrast, for example, installing the bristles 735 onto an angled wall (e.g., onto the final, folded, configuration of the brush assembly 730 shown in FIG. 7B) can require a significantly more complicated method.

Figure 8:
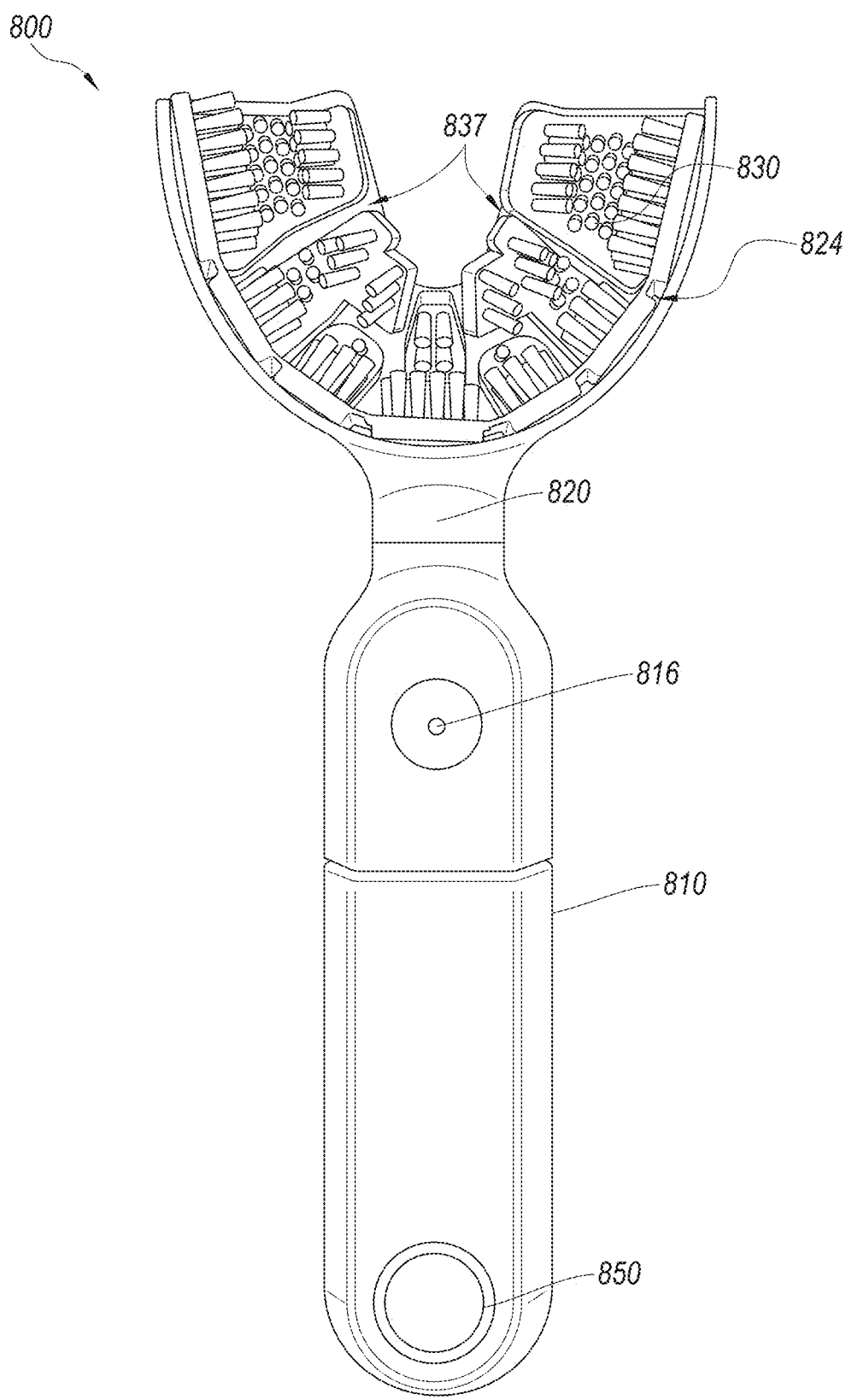
FIG. 8 is a front view of a toothbrush configured in accordance with another embodiment of the present technology.

FIG. 8 is a front view of a toothbrush 800 configured in accordance with another embodiment of the present technology. The toothbrush 800 includes some features generally similar to the features of the toothbrushes 100 and 600 described in detail above with reference to FIGS. 1A-6B. For example, the toothbrush 800 includes a handle 810 coupled to a mouthguard 820, and a brush assembly 830 removably positioned within a channel 824 of the mouthguard 820. The handle 810 includes a motor (e.g., motor 914 shown in FIG. 9) that is operably coupled to the brush assembly 830 and configured to move (e.g., articulate) the brush assembly 830 through/along the channel 824 of the mouthguard 820. In some embodiments, the brush assembly 830 can be cycled through the channel 824 at a rate of about 12-15 strokes per second (e.g., when the brush assembly 830 is not positioned against the teeth of a user). As described in detail above, the mouthguard 820 can include slots (obscured in FIG. 8; e.g., slots 1027 shown in FIG. 10B) that allow the mouthguard 820 to bend/flex to facilitate movement of the mouthguard 820 across all the user's lower and/or upper teeth. Similarly, the brush assembly 830 can include slots 837 that allow the brush assembly 830 to move smoothly along the entire length of the channel 824 of the mouthguard 820.

In the illustrated embodiment, the handle 810 is generally straight and has a generally cylindrical or rectilinear cross-sectional shape. The handle 810 further includes a power/operation button 816 and an indicator 850. In the illustrated embodiment, the indicator 850 is a light ring that can be partially or entirely illuminated (e.g., via one or more LED lights disposed within the handle 810) to provide visual indications/cues to a user of the toothbrush 800 of, for example, changes in a brushing cycle or operational mode of the toothbrush 800. In some embodiments, pressing the button 816 for a first length of time (e.g., more than one second) can initiate a first operational mode of the toothbrush 800, while pressing the button 816 for a second length of time (e.g., less than one second) can initiate a second operational mode of the toothbrush 800. In some embodiments, the first operational mode is a manual mode in which the toothbrush 800 operates continuously. In some embodiments, as described in greater detail below with reference to FIG. 13, the second operational mode can be an automatic mode that guides the user and toggles the power of the toothbrush 800 automatically through a brushing cycle.

Figure 9:
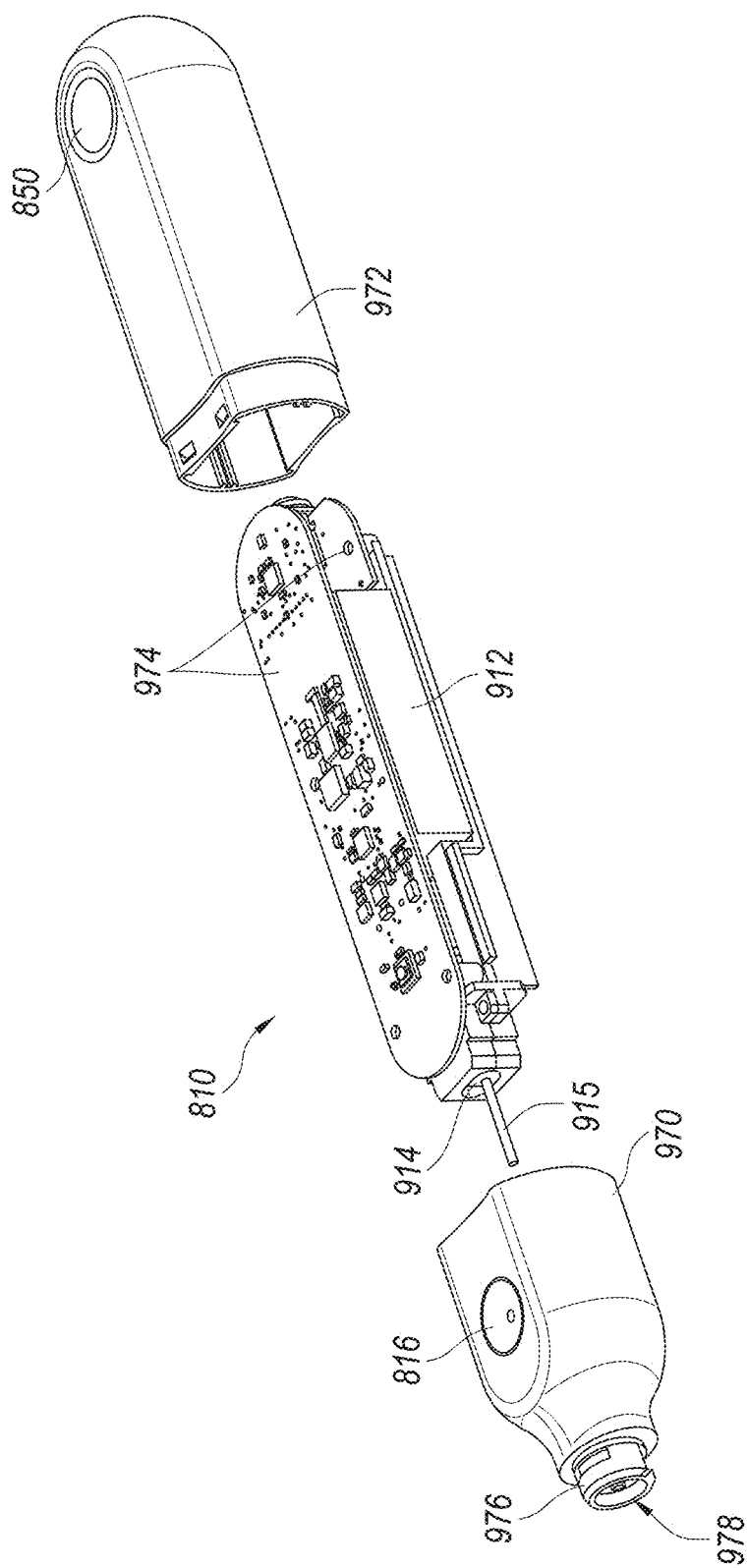
FIG. 9 is a partially-exploded isometric view of a handle of the toothbrush shown in FIG. 8 configured in accordance with an embodiment of the present technology.

FIG. 9 is a partially-exploded isometric view of the handle 810 configured in accordance with an embodiment of the present technology. In the illustrated embodiment, the handle 810 includes a first housing portion 970 and a second housing portion 972 that can be releasably or permanently coupled together via, for example, a snap-lock arrangement, twist-lock arrangement, fasteners, and/or another suitable configuration. A power source 912, a motor 914 (partially obscured in FIG. 9), and one or more circuit boards 974 are positioned within an interior of the handle 810 defined by the first and second housing portions 970 and 972. In the illustrated embodiment, the power source 912 is a battery pack that is electrically coupled to the motor 914 and configured to power the motor 914. In some embodiments, for example, the power source 912 can have a capacity of 1000 mAh at 3.7 V. In other embodiments, however, the power source 912 may have a different capacity. The circuit boards 974 are operably/communicatively coupled to the button 816 and the indicator 850 and are configured to provide suitable control signals and/or power to/from the button 816, the indicator 850, and/or electronic components on the circuit boards 974. In some embodiments, the circuit boards 974 can include one or more controllers configured to receive user inputs from the button 816 and to control operation of the motor 914 and the indicator 850 based on the user inputs.

The motor 914 is operably coupled to a shaft 915 that extends through the first housing portion 970 and from an aperture 978 therein. As described above and in greater detail below with reference to FIGS. 10A-10C, the shaft 915 can operably engage the brush assembly 830 (FIG. 8) to drive the brush assembly 830 relative to the mouthguard 820 (FIG. 8). In some embodiments, the motor 914 is a rotary motor and the shaft 915 is coupled to the motor 914 off a rotational axis of the motor 914.

Figure 10A:
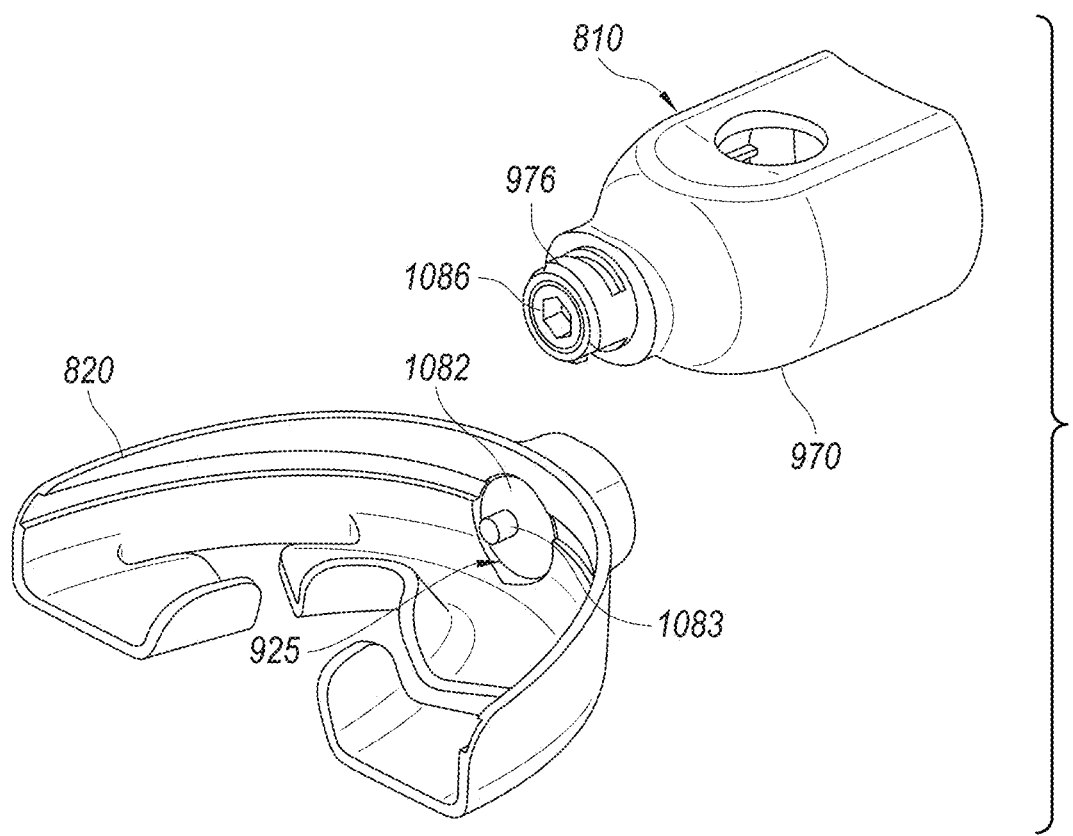
FIGS. 10A and 10B are an isometric view and an exploded isometric view, respectively, of the handle and a mouthguard of the toothbrush shown in FIG. 8 configured in accordance with embodiments of the present technology.
Figure 10B:
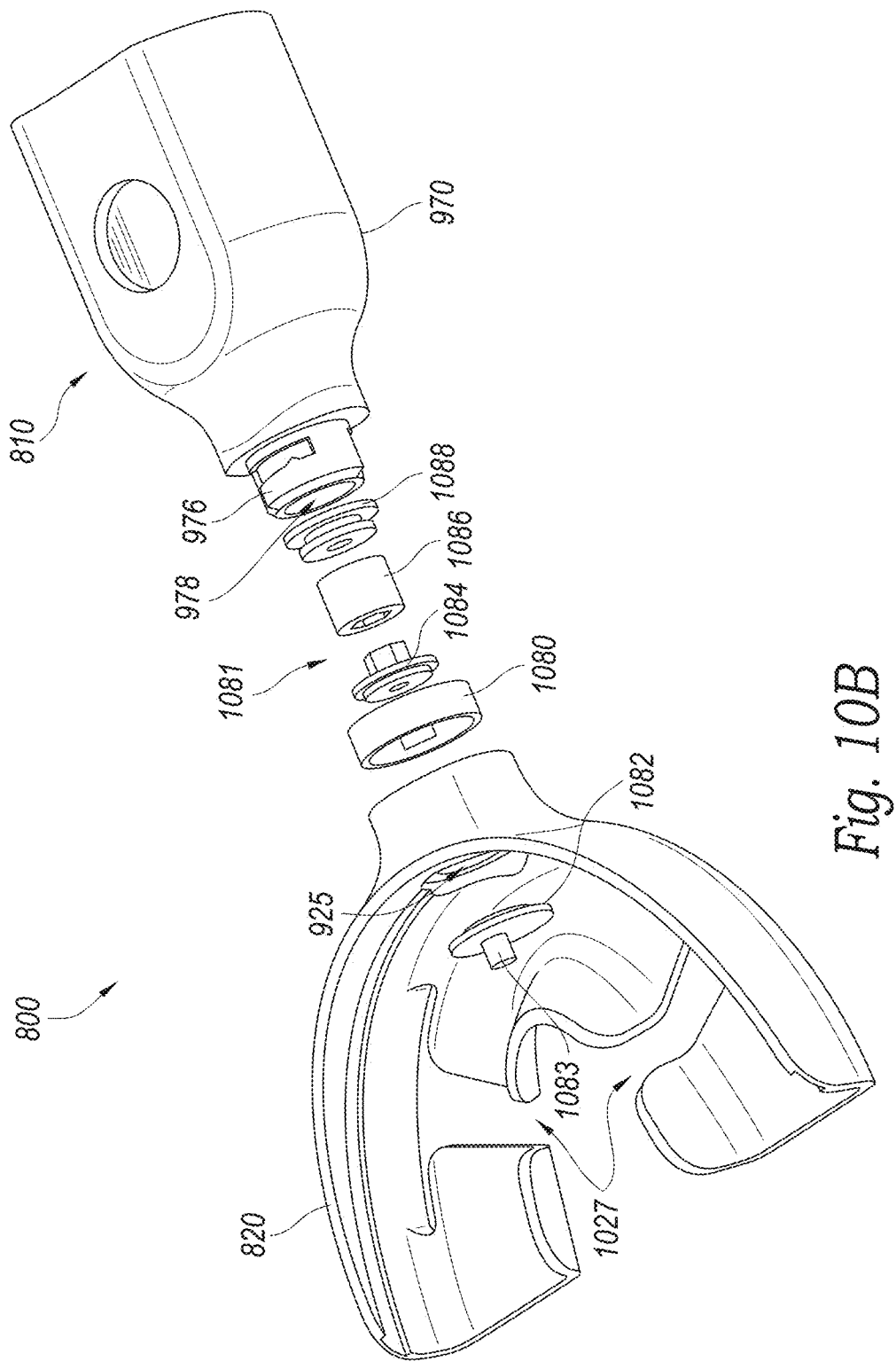
Figure 10C:
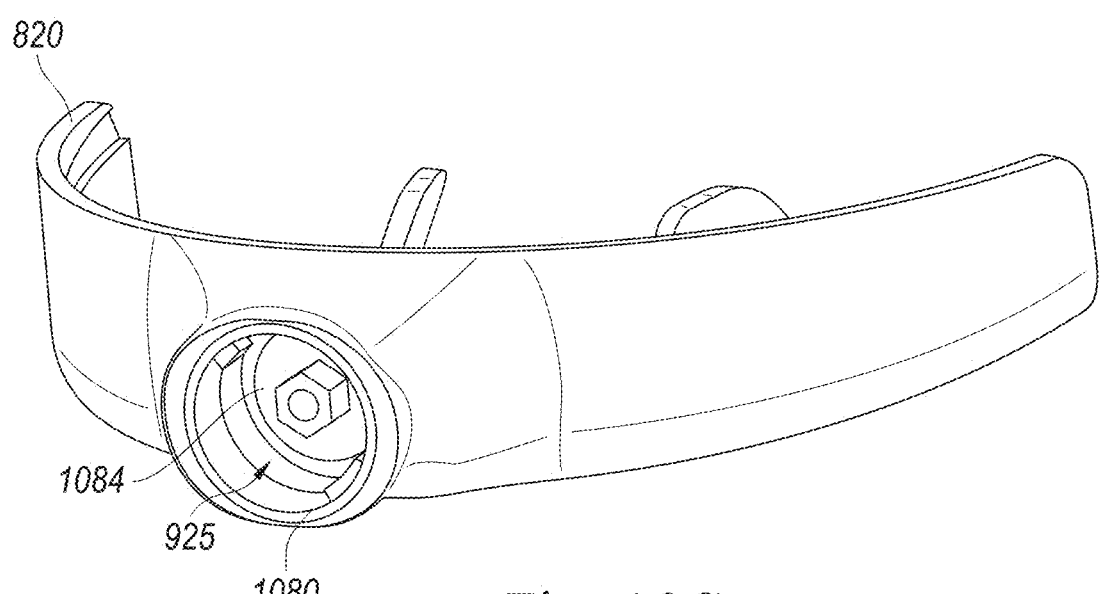
FIG. 10C is a rear isometric view of the mouthguard of the toothbrush shown in FIG. 8 configured in accordance with an embodiment of the present technology.

As further shown in FIG. 9, the first housing portion 970 includes a first coupling portion 976 configured to be releasably secured to the mouthguard 820 (FIG. 8). More particularly, FIGS. 10A and 10B are an enlarged isometric view and an exploded isometric view, respectively, of the mouthguard 820 and the first housing portion 970 of the handle 810 configured in accordance with embodiments of the present technology. FIG. 10C is a rear isometric view of the mouthguard 820 configured in accordance with an embodiment of the present technology. Referring to FIGS. 10A-10C together, the mouthguard 820 can include an aperture 925 extending through a wall portion thereof. In the illustrated embodiment, a second coupling portion 1080 can be secured within the aperture 925 via welding, a press-fit, adhesives, fasteners, etc. In some embodiments, the second coupling portion 1080 is integrally formed with the mouthguard 820. The second coupling portion 1080 is configured to releasably mate/engage with the first coupling portion 976 of the handle 810 to secure the mouthguard 820 to the handle 810. For example, in some embodiments, the first and second coupling portions 976 and 1080 can be secured together via a twist-lock arrangement. That is, the user can insert the first coupling portion 976 of the handle 810 into the aperture 925 and twist to secure the mouthguard 820 to the handle 810. In one aspect of the present technology, this arrangement allows the mouthguard 820 to be easily disconnected from the handle 810 to, for example, facilitate replacement or cleaning of the mouthguard 820 and/or the brush assembly 830.

In the illustrated embodiment, the toothbrush 800 further includes a coupling assembly 1081 including a first coupling piece 1082, a second coupling piece 1084, a third coupling piece 1086, and a fourth coupling piece 1088. The first and second coupling pieces 1082 and 1084 can be secured together within the aperture 925 in the mouthguard 820 via a press-fit, welding, etc. In the illustrated embodiment, the first coupling piece 1082 includes an engagement feature 1083 configured to project out of the aperture 925 into the channel 824 of the mouthguard 820 and to engage the brush assembly 830 (FIG. 8). The third and fourth coupling pieces 1086 and 1088 can be similarly secured together within the aperture 978 of the first coupling portion 976 of the handle 810. In operation, when the handle 810 is secured to the mouthguard 820, the second coupling piece 1084 can operably engage the third coupling piece 1086. In the illustrated embodiment, the shaft 915 (FIG. 9) can extend at least partially through the coupling assembly 1081 (e.g., through the fourth coupling piece 1088, the third coupling piece 1086, and the second coupling piece 1084) to engage the first coupling piece 1082. In operation, movement of the shaft 915 can move (e.g., rotate) the first coupling piece 1082 to drive the engagement feature 1083 to thereby drive the brush assembly 830 through the channel 824 of the mouthguard 820. In other embodiments, the coupling assembly 1081 can be operably coupled to the shaft 915 and/or the brush assembly 830 in other suitable manners.

Figure 11:
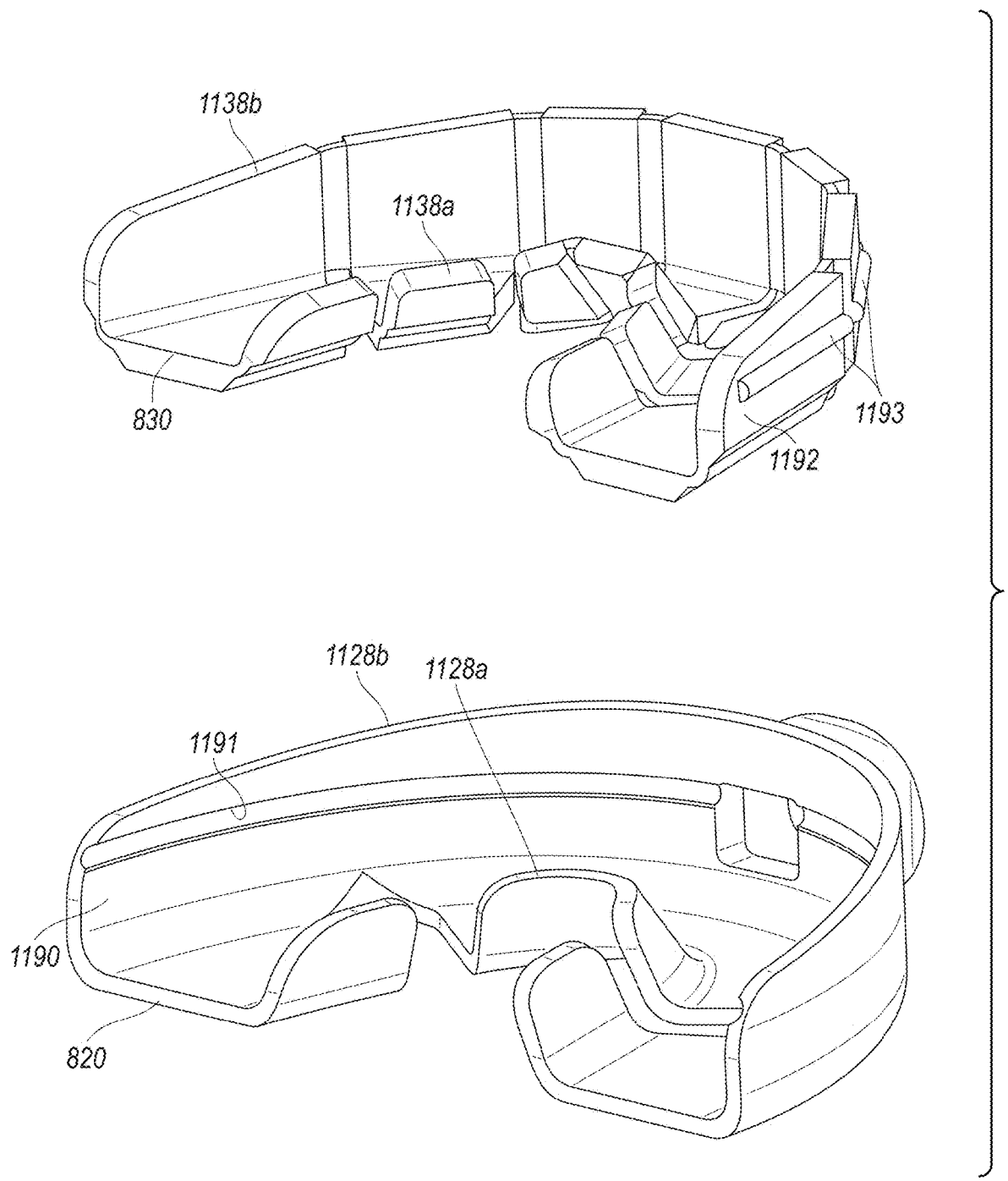
FIG. 11 is an isometric view of the toothbrush shown in FIG. 8 illustrating a brush assembly removed from the mouthguard in accordance with an embodiment of the present technology.

FIG. 11 is an isometric view showing the brush assembly 830 of toothbrush 800 (FIG. 8) removed from the mouthguard 820 in accordance with an embodiment of the present technology. The bristles of the brush assembly 830 are not shown in FIG. 11 for the sake of clarity. In the illustrated embodiment, the mouthguard 820 includes a first wall portion 1128a and a second wall portion 1128b. Similarly, the brush assembly 830 includes a first wall portion 1138a and a second wall portion 1138b. When the brush assembly 830 is positioned within the mouthguard 820, a first surface 1190 of the second wall portion 1128b of the mouthguard 820 faces/abuts a second surface 1192 of the second wall portion 1138b of the brush assembly 830. In the illustrated embodiment, a channel 1191 is formed at least partially in/along the first surface 1190 of the mouthguard 820, and a ridge 1193 (e.g., projection, protrusion, etc.) is formed at least partially on/along the second surface 1192 of the brush assembly 830. The channel 1191 is configured to slidably receive the ridge 1193 therein to, for example, inhibit vertical movement of the brush assembly 830 while still permitting lateral movement of the brush assembly 830 during operation of the toothbrush 800. In some embodiments, the ridge 1193 can be snap-fit into or otherwise removably coupled to the channel 1191 to secure the brush assembly 830 to the mouthguard 820.

In some embodiments, the brush assembly 830 is formed to be flexible/resilient such that the wall portions 1138 of the brush assembly 830 exert a force (e.g. a spring force) against the wall portions 1128 of the mouthguard 820 when the brush assembly 830 is installed within the mouthguard 820. Specifically, the second wall portion 1138b of the brush assembly 830 can exert a force against the second wall portion 1128b of the mouthguard 820 that acts to hold/maintain the ridge 1193 within the channel 1191. Accordingly, in some embodiments a user can install the brush assembly 830 within the mouthguard 820 by pinching the wall portions 1138 of the brush assembly 830 toward one another before positioning the brush assembly 830 within the mouthguard 820. Similarly, the user can remove the brush assembly 830 from the mouthguard 820 by pinching the wall portions 1138 toward one another to flex the ridge 1193 out of the channel 1191 before lifting the brush assembly 830 out of the mouthguard 820.

Figure 12A:
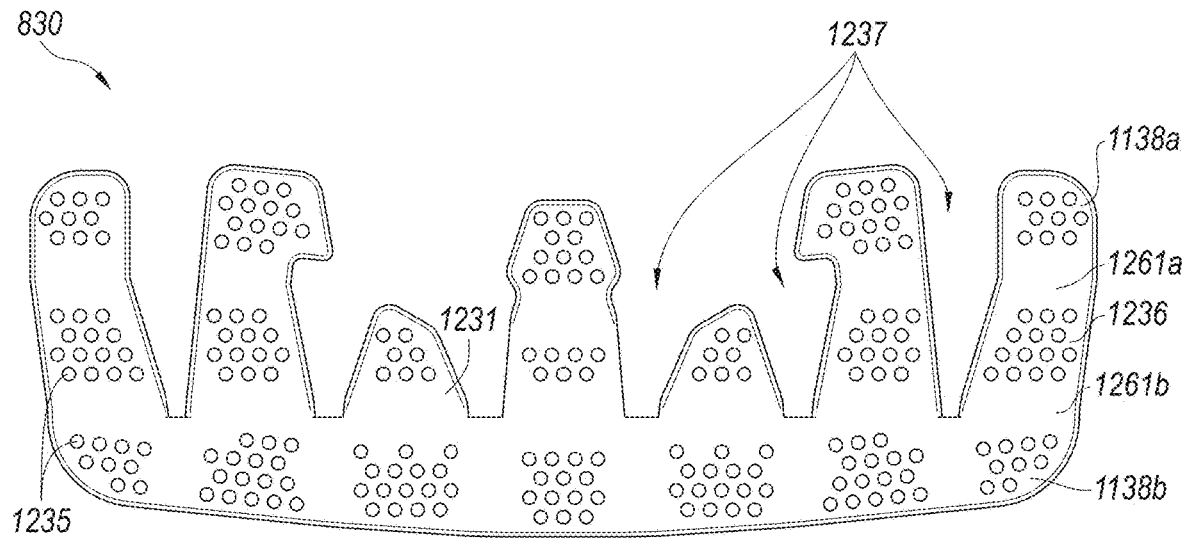
FIGS. 12A-12C are a top view, a side view, and a bottom view, respectively, of the brush assembly of the toothbrush of FIG. 8 configured in accordance with embodiments of the present technology.
Figure 12B:
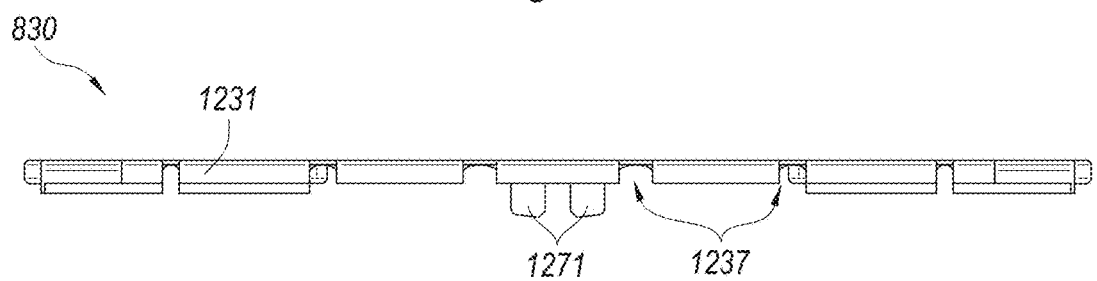
Figure 12C:
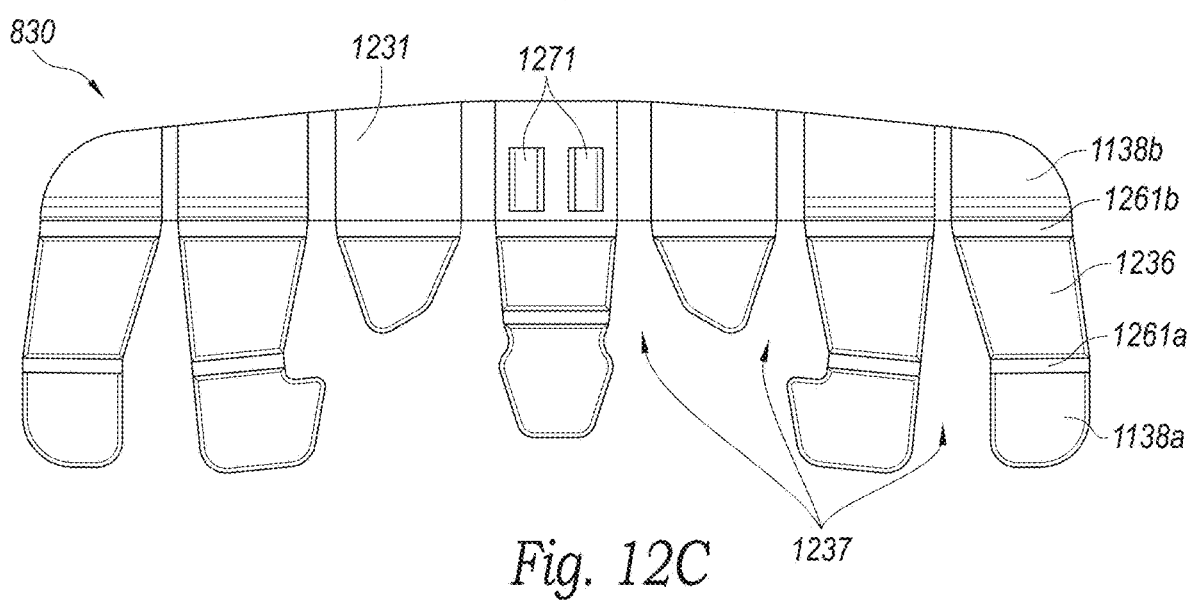

FIGS. 12A-12C are a top view, a side view, and a bottom view, respectively, of the brush assembly 830 configured in accordance with embodiments of the present technology, and before bending/folding the brush assembly 830 during a manufacturing process. The brush assembly 830 can be generally similar to the brush assemblies 130, 630, and 730 described in detail above with reference to FIGS. 1A-7B. For example, referring to FIGS. 12A-12C together, the brush assembly 830 includes a body 1231 having a trough portion 1236, and the wall portions 1138 extend from the trough portion 1236. Likewise, a plurality of slots 1237 extend at least partially through the brush assembly 830, and a plurality of bristles 1235 (FIG. 12A) are coupled to the brush assembly 830. The brush assembly 830 further includes (i) a first crease/hinge 1261a between the first wall portion 1138a and the trough portion 1236 and (ii) a second crease/hinge 1261b between the second wall portion 1138b and the trough portion 1236. In some embodiments, the creases 1261 are relatively thinner than the trough portion 1236 and the wall portions 1138 such that the creases 1261 are relatively more flexible. In some embodiments, a thickness of the creases 1261 can be about 0.4 millimeters. In the illustrated embodiment, the brush assembly 830 further includes an engagement feature 1271 configured to interface with or otherwise engage the engagement feature 1083 (FIGS. 10A-10C) of the first coupling piece 1082 (FIGS. 10A-10C) to operably couple the motor 914 (FIG. 9) to the brush assembly 830.

The brush assembly 830 can be manufactured initially to have the flat/planar configuration shown in FIGS. 12A-12C. The brush assembly 830 can then be bent/folded along the creases 1261 to have the desired final shape. In some embodiments, the bristles 1235 can be installed into the brush assembly 830 to have variable angles and/or lengths (e.g., during a CNC tufting process) such that, after folding the brush assembly 830 along the creases 1261, the angles and lengths of the bristles 1235 resolve into a desired topography that is engineered to maximize teeth brushing efficacy. The bristles 1235 can have the same or different spacings, cross-sectional dimensions, shapes, relative angles, lengths, finishes, end shapes (e.g., flat-ended, round-ended, etc.), etc.

Figure 13:
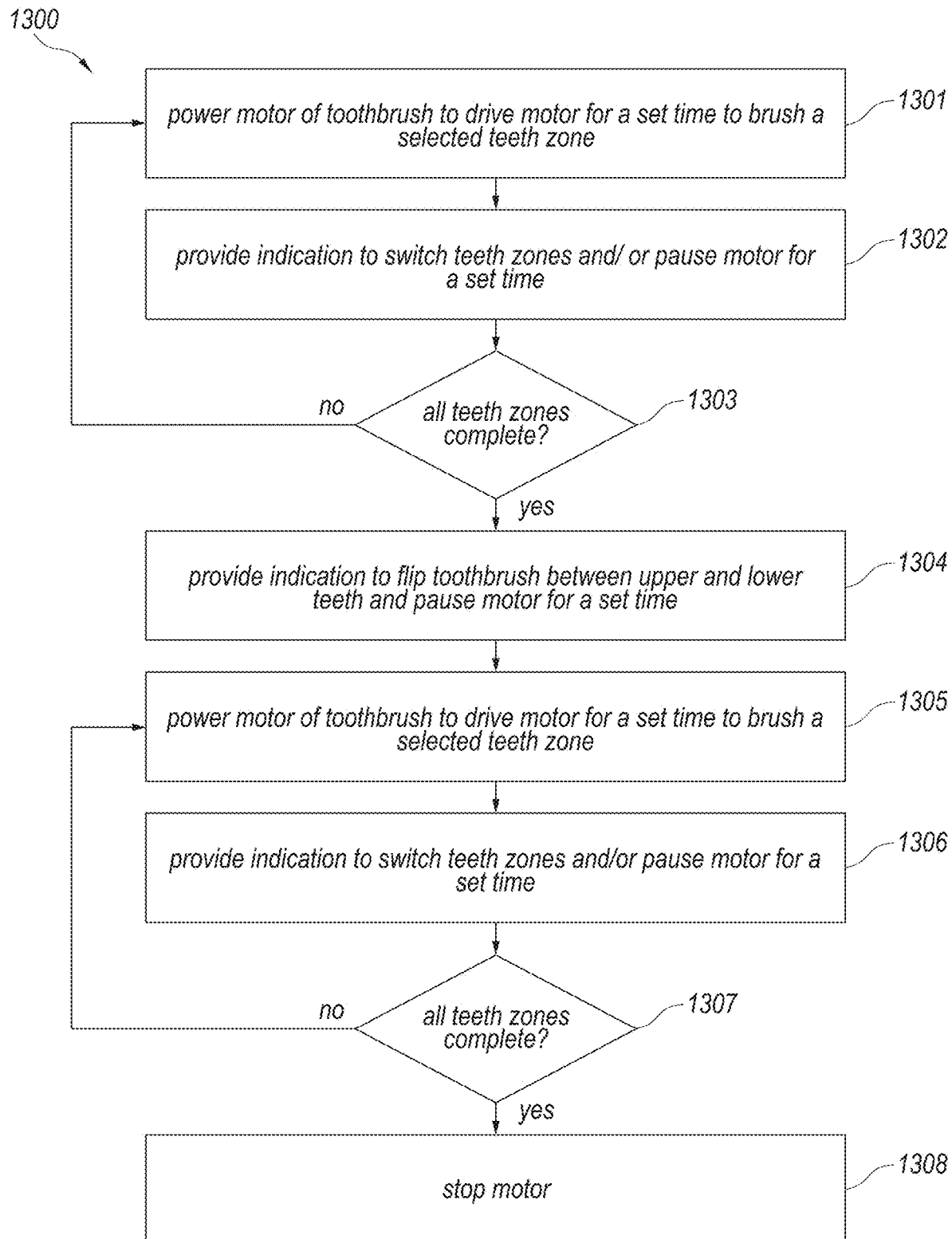
FIG. 13 is a flow diagram illustrating a method of automatic operation of a toothbrush in accordance with an embodiment of the present technology.

FIG. 13 is a flow diagram illustrating a method of automatic operation of the toothbrush 800 in accordance with an embodiment of the present technology. Referring to FIGS. 8-13 together, a user can initially grip the handle 810 and position the mouthguard 820 and brush assembly 830 in their mouth around either their upper or lower teeth. The user can then push the button 816 to enter an automatic mode of operation (e.g., by pressing the button 816 once quickly).

In the automatic mode of operation, at block 1301, the toothbrush 800 can power the motor 914 to drive the brush assembly 830 to move/articulate within the channel 824 of the mouthguard 820 for a set time to brush a selected teeth zone. For example, the user can first position the toothbrush around a left, center, or right zone of their upper teeth to brush that zone. In some embodiments, the set time is about 5 seconds. At block 1302, after the set time as elapsed, the toothbrush 800 can provide an indication to the user via the indicator 850 to switch teeth zones (e.g., to move from the center zone to the left zone, from the center zone to the right zone, etc.) and/or can pause the motor 914 (e.g., for about 0.5 second). For example, the indicator 850 can flash, selectively illuminate, etc., to indicate to the user that it is appropriate to switch to brushing another teeth zone. In some embodiments, the indicator 850 can indicate the next brushing zone by directionally illuminating a left portion, a central portion, a right portion, etc., of the indicator 850 that indicates the next corresponding teeth zone (e.g., left zone, central zone, right zone, etc.).

At decision block 1303, the toothbrush 800 can determine whether all teeth zones have been brushed for the upper teeth of the user (or the lower teeth if the user chose to initially brush their lower teeth). For example, if the upper and lower teeth are divided into three zones (left, center, and right), the toothbrush 800 can indicate that all zones are complete after indications have been provided to switch between each zone. If all zones have not been completed, the method returns to block 1301 to allow the user to brush another portion of their teeth. If all zones have been completed, the method proceeds to block 1304, where the toothbrush 800 provides an indication to flip the toothbrush 800 over and position it around the lower teeth of the user (or the upper teeth if the user chose to initially brush their lower teeth). At block 1304, the toothbrush can pause the motor 914 for a set time (e.g., 5 seconds) so that the user can reposition the toothbrush 800 without the brush assembly 830 being driven.

Blocks 1305-1307 can proceed generally similarly or identically to blocks 1301-1303 to guide the user through brushing each zone of the lower teeth (or the upper teeth if the user chose to initially brush their lower teeth). At decision block 1307, if all zones are complete, the method proceeds to block 1308 and stops the motor 914 to end the brushing cycle.

Although described above in the context of the toothbrush 800, the method 1300 can be implemented using any of the toothbrushes of the present technology described in detail herein.

In some embodiments, a toothbrush configured in accordance with the present technology can be adapted for use with teeth-whitening components such as, for example, whitening lights. For example, with reference to toothbrush 800 described above with respect to FIGS. 8-10C, the brush assembly 830 can be swapped/replaced for a whitening assembly (not shown) including a whitening light or other component configured to whiten the teeth of a user. In some embodiments, such a whitening assembly can be electrically coupled to the power source 912 for powering the whitening light. In operation, the mouthguard 820 and the whitening assembly can be positioned around the upper and/or lower teeth of a user for a predetermined period of time or a user-selected period of time. In some embodiments, the motor 914 need not drive the whitening assembly through the mouthguard 820. Instead, the user can simply flexibly position/move the mouthguard 820 around their teeth while the whitening assembly remains stationary relative to the mouthguard 820.

In some embodiments, the toothbrushes described in detail herein can be communicatively coupled to one or more user devices (e.g., smartphones, tablets, personal computers, etc.) and/or remote computing systems. FIG. 14, for example, is a schematic view of a computing environment 1490 in which the aspects of the present technology can be implemented. The computing environment 1490 can include (i) a toothbrush 1400, (ii) one or more remote computing systems 1495 including one or more processors 1496 (e.g., servers) and one or more memory devices 1497, and/or (iii) one or more user devices 1499. The toothbrush 1400, the remote computing systems 1495, and the user devices 1499 can be communicatively coupled together via one or more communication channels, such as a communication network 1498. The toothbrush 1400 can include features generally similar to or identical to the features of the toothbrushes 100, 600, and/or 800 described in detail above with reference to FIGS. 1A-13.

The one or more user devices 1499 can communicate within the environment 1490 via the network 1498 to provide input to the toothbrush 1400, such as instructions/inputs for controlling operation of the toothbrush 1400. For example, in some embodiments, the user can select different brushing patterns (e.g., selectively brushing certain portions of a user's teeth in a different fashion than portions), operational modes (e.g., automatic or manual), power levels (e.g., high-power, medium-power, low-power, etc.), etc., of the toothbrush 1400 via an application running on the user devices 1499. In some embodiments, the toothbrush 1400 can communicate, via the communication network 1498, information to the user devices 1499 and/or the remote computing systems 1496, such as brushing statistics, operational characteristics, brushing history or reports, etc. In some embodiments, such information can be viewed in an application running on the user devices 1499. In some embodiments, the toothbrush 1400 can communicate alerts to the user devices 1499 indicating that is time to replace a brush assembly of the toothbrush 1400, charge the toothbrush 1400, visit a dentist, etc. The network 1498 can be a local area network (LAN), a personal area network (PAN), a wide area network (WAN), and/or a combination of such networks, but can also be other wired or wireless networks. The network 1498 may be the Internet or some other public or private network. The user devices 1499 and the toothbrush 1400 can be connected to network 1498 through a network interface, such as by a wired or wireless communication interface (e.g., a Bluetooth interface).

The present technology can be embodied as special-purpose hardware (e.g., circuitry), as programmable circuitry appropriately programmed with software and/or firmware, or as a combination of special-purpose and programmable circuitry. Hence, embodiments of the present technology can include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The present technology can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or sub-routines may be located in both local and remote memory storage devices. Aspects of the technology described above may be stored or distributed on computer-readable media or, alternatively, aspects of the technology may be distributed electronically over the Internet or over other networks (including wireless networks). Those skilled in the relevant art will recognize that portions of the technology may reside on a server computer, while corresponding portions reside on a client/user computer. Data structures and transmission of data particular to aspects of the technology are also encompassed within the scope of the technology.

III. Conclusion

The above detailed description of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order, alternative embodiments may perform steps in a different order. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A method of manufacturing an assembly for a toothbrush, the method comprising:
    forming a body having a first side and second side, wherein the body has a generally planar shape including a trough portion and wall portions extending from the trough portion, and wherein the body includes an engagement feature on the second side on one side of the wall portions, and further wherein the engagement feature is shaped and sized to be operably coupled to a motor of the toothbrush;
    coupling a plurality of bristles to the first side of the body; and
    bending the wall portions relative to the trough portion to define a channel, wherein the bristles extend at least partially into the channel, wherein the trough portion has a U-like shape, and wherein the channel is sized to be positioned over most of the lower or upper teeth of a user.

2. The method of claim 1 wherein at least one of the bristles has a different length than another one of the bristles.

3. The method of claim 1 wherein, after coupling the bristles to the body, at least one of the bristles has a different angle relative to the body than another one of the bristles.

4. The method of claim 1 wherein bending the wall portions further includes heating the body.

* * * * *

UNITED STATES PATENT AND TRADEMARK OFFICE
CERTIFICATE OF CORRECTION

| | |
|---|---|
| PATENT NO. | : 11,246,400 B2 |
| APPLICATION NO. | : 16/675153 |
| DATED | : February 15, 2022 |
| INVENTOR(S) | : Keith A. Arbeitman et al. |

It is certified that error appears in the above-identified patent and that said Letters Patent is hereby corrected as shown below:

In the Claims

In Column 17, Line 20, in Claim 1, after "and" insert -- a --.

In Column 18, Line 2, in Claim 1, delete "one side" and insert -- one --.

Signed and Sealed this
Twenty-fourth Day of May, 2022

Katherine Kelly Vidal
*Director of the United States Patent and Trademark Office*